United States Patent
Kiran et al.

(10) Patent No.: US 12,457,173 B2
(45) Date of Patent: Oct. 28, 2025

(54) AUTONOMOUS TRAFFIC (SELF-DRIVING) NETWORK WITH TRAFFIC CLASSES AND PASSIVE AND ACTIVE LEARNING

(71) Applicant: THE REGENTS OF THE UNIVERSITY OF CALIFORNIA, Oakland, CA (US)

(72) Inventors: Mariam Kiran, San Ramon, CA (US); Nicholas Buraglio, Berkeley, CA (US); Scott Campbell, Lake Oswego, OR (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 279 days.

(21) Appl. No.: 18/052,614

(22) Filed: Nov. 4, 2022

(65) Prior Publication Data
US 2023/0145097 A1 May 11, 2023

Related U.S. Application Data

(60) Provisional application No. 63/276,148, filed on Nov. 5, 2021.

(51) Int. Cl.
*H04L 47/127* (2022.01)
*H04L 41/147* (2022.01)
(Continued)

(52) U.S. Cl.
CPC .......... *H04L 47/127* (2013.01); *H04L 41/147* (2013.01); *H04L 41/16* (2013.01); *H04L 47/2483* (2013.01)

(58) Field of Classification Search
None
See application file for complete search history.

(56) References Cited

U.S. PATENT DOCUMENTS

2018/0359172 A1* 12/2018 Yadav ............... H04L 41/5051
2021/0334655 A1* 10/2021 Obika ....................... G06N 3/08
(Continued)

OTHER PUBLICATIONS

Rusek, RouteNet: Leveraging Graph Neural Networks for Network Modeling and Optimization in SDN, Oct. 2020, IEEE vol. 38 No. 10 (Year: 2020).*

(Continued)

*Primary Examiner* — Fadi Haj Said
(74) *Attorney, Agent, or Firm* — O'BANION & RITCHEY LLP; John P. O'Banion

(57) ABSTRACT

A method and apparatus for dynamically routing traffic from a first network device to a second network device is described. In one implementation, the method includes sampling one or more qualified packets from an ingress stream using neural network classification criteria, appending a flow encapsulation header with the path information, providing the path information to the path computation engine at user approved time intervals, transmitting the packets to destination network device, and collecting real-time network telemetry data. Real-time network telemetry data is stored in a network health database. When a new network transfer is introduced, the system correctly identifies the characteristics of the transfer, in terms of size, throughput, jitter, latency, loss, and completion times. A corrective action is introduced that inputs the current network health information and transfer characteristics by generating corrective control rules to allow the transfer to be optimally routed (e.g., automatically) through the network.

20 Claims, 19 Drawing Sheets

(51) Int. Cl.
  *H04L 41/16* (2022.01)
  *H04L 47/2483* (2022.01)

(56) References Cited

U.S. PATENT DOCUMENTS

2022/0103597 A1\* 3/2022 Gobena ................. H04L 63/205
2023/0362082 A1\* 11/2023 Svennebring ......... H04W 24/08

OTHER PUBLICATIONS

Kephart, Jeffrey O., et al., "The Vision of Autonomic Computing", IEEE Computer Society, Jan. 2003, pp. 41-50.
Kiran, Mariam, et al., "DeepRoute: Herding Elephant and Mice Flows with Reinforcement Learning", Energy Sciences Network, Scientific Data Management, Lawrence Berkeley National Laboratory, pp. 1-19.
Mallick, Tanwi, et al., "Dynamic Graph Neural Network for Traffic Forecasting in Wide Area Networks", 2020 IEEE International Conference on Big Data (Big Data), pp. 1-10.
Dominicini, Cristina et al., "PoIKA: Polynomial Key-based Architecture for Source Routing in Network Fabrics", 2020 6th IEEE International Conference on Network Softwarization (Netsoft), pp. 1-9.
Awduche, D. et al., "RSVP-TE: Extensions to RSVP for L&P Tunnels", Network Working Group, Standards Track, Dec. 2001, pp. 1-61.
Rekhter, Y. et al., A Border Gateway Protocol 4 (BGP-4), Network Working Group, Standards Track, Jan. 2006, pp. 1-104.
Ould-Brahim, H. et al., "BGP Traffic Engineering Attribute", Network Working Group, Standards Track, May 2009, pp. 1-6.
Filsfils, C. et al., "Segment Routing Architecture", Internet Engineering Task Force (IETF), Standards Track, Jul. 2018, pp. 1-32.
Rusek, Krzysztof et al., "RouteNet: Leveraging Graph Neural Networks for network modeling and optimization in SDN", IEEE Journal on Selected Areas in Communications, Jul. 9, 2020, pp. 1-12.
Campbell, Scott et al., "Unsupervised Anomaly Detection in Daily WAN Traffic Patterns", Smoky Mountains Computational Sciences & Engineering Conference Aug. 16, 2020, pp. 1-17.
Bosch, Sergi Carol, "A Benchmark for Graph Neural Networks for Computer Network Modeling", Universitat Politecnica De Catalunya, Thesis, Jun. 27, 2019, pp. 1-71.
Tootoonchian, Amin et al., "On Controller Performance in Software-Defined Networks", USENIX Association, San Jose, CA. https://www.usenix.org/conference/hot-ice12/workshop-program/presentation/tootoonchian, pp. 1-6.
Kiran, Mariam, et al., "Hecate: AI-driven WAN Traffic for Engineering Science", SC22, Dallas, Texas, hpc accelrates, 2022, pp. 1-21.

\* cited by examiner

AUTONOMOUS TRAFFIC (SELF-DRIVING) NETWORK WITH TRAFFIC CLASSES AND PASSIVE AND ACTIVE LEARNING

CROSS-REFERENCE TO RELATED APPLICATIONS

This application claims priority to, and the benefit of, U.S. provisional patent application Ser. No. 63/276,148 filed on Nov. 5, 2021, incorporated herein by reference in its entirety.

STATEMENT REGARDING FEDERALLY SPONSORED RESEARCH OR DEVELOPMENT

This invention was made with government support under Contract No. DE-AC02-05CH11231 awarded by the U.S. Department of Energy. The government has certain rights in this invention.

INCORPORATION-BY-REFERENCE OF COMPUTER PROGRAM APPENDIX

Appendix A referenced herein is a computer program listing in a text file entitled "UCLBL-2021-010-02-US-computer_program_appendix_A.txt" created on Nov. 2, 2022 and having a 344 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This disclosure relates generally to a method of and device for optimum real-time control of a network path computation engine driven by data-driven learning of current network health and traffic characteristics. This disclosure relates specifically to a technique that serves to provide multi-objective optimization of network traffic engineering (taking into account e.g., utilization, flow completion times, and latency times).

2. Background Discussion

Traffic optimization and path computation are challenging tasks for network engineers. Recent technologies require meticulously designed heuristics to calculate optimal routing strategies, however, such technologies fail to take into account traffic characteristics, which can be of paramount importance in scientific data processing.

BRIEF SUMMARY

This disclosure describes methods and apparatus for dynamically routing traffic from a first network device to a second network device. The technology is referred to herein as Hecate.

In one embodiment, a method according to the technology of this disclosure comprises sampling one or more qualified packets from an ingress stream using neural network classification criteria, appending a flow encapsulation header with the path information, providing the path information to the path computation engine at user approved time intervals, transmitting the packets to destination network device, and collecting real-time network telemetry data. Real-time network telemetry data is stored in a network health database. When a new network transfer is introduced, the system correctly identifies the characteristics of the transfer, in terms of size, throughput, jitter, latency, loss, and completion times. A corrective action is introduced that inputs the current network health information and transfer characteristics by generating corrective control rules to allow the transfer to be optimally routed (e.g., automatically) through the network.

One aspect of the technology is to provide a real-time traffic classification system (using deep learning clustering methods like unsupervised learning) that adaptively learns traffic classes that represent dominant traffic characteristics.

Another aspect of the technology is the ability to learn traffic classes based on the network itself (Hecate's traffic classes: learn optimal characteristics of the traffic patterns on the network).

Another aspect of the technology is the ability to group long and short flows based on size, and protocols assists in managing flows more efficiently.

Another aspect of the technology is providing deep reinforcement learning for the optimizer to self-learn optimal paths.

Another aspect of the technology is providing health mirroring (e.g., about network traffic) to collect network health statistics about the links in order to help manage them more effectively. In some implementations, sensors on these links help to collect data to be used in the data-driven learning of the Machine Learning (ML) models.

Another aspect of the technology is improving one or more network performance criteria.

Another aspect of the technology is passive and active learning. Hecate can perform both passive and active learning to determine optimum paths for the different traffic flows running across or transiting through a network. In passive learning, it uses health information in the form of current throughput, loss, latency, and jitter to predict future network health (throughput, latency, loss, jitter) per link. These predicted values can be combined with traffic classification for use by the Hecate orchestrator to optimize which path to use. In active learning, we introduce the concepts of Hecate flows, which are actively sent across the network, so Hecate can obtain real-time analysis of which traffic flows are performing better on which network path.

As a result, Hecate can learn to prioritize certain traffic classes if the user objectives are being met.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

By way of example, and not of limitation, this disclosure describes an artificial intelligence (AI) driven technology which is also referred to herein as "Hecate". In some embodiments, the AI-driven techniques described herein use data-driven deep learning to learn traffic characteristics, network conditions, and historical behaviors to determine optimal traffic engineering patterns via reinforcement learning. In some embodiments, the AI-driven techniques comprise a stand-alone system that can be plugged into a network setup to optimize its traffic engineering efforts without excessive human interaction. Some embodiments described herein use two kinds of deep learning: (1) unsupervised classification to learn dominant traffic characteristics from the flow profiles on the network; and (2) deep reinforcement learning to allow the optimizer to self-learn optimal paths for different kinds of traffic profiles on the network.

Figure 1:
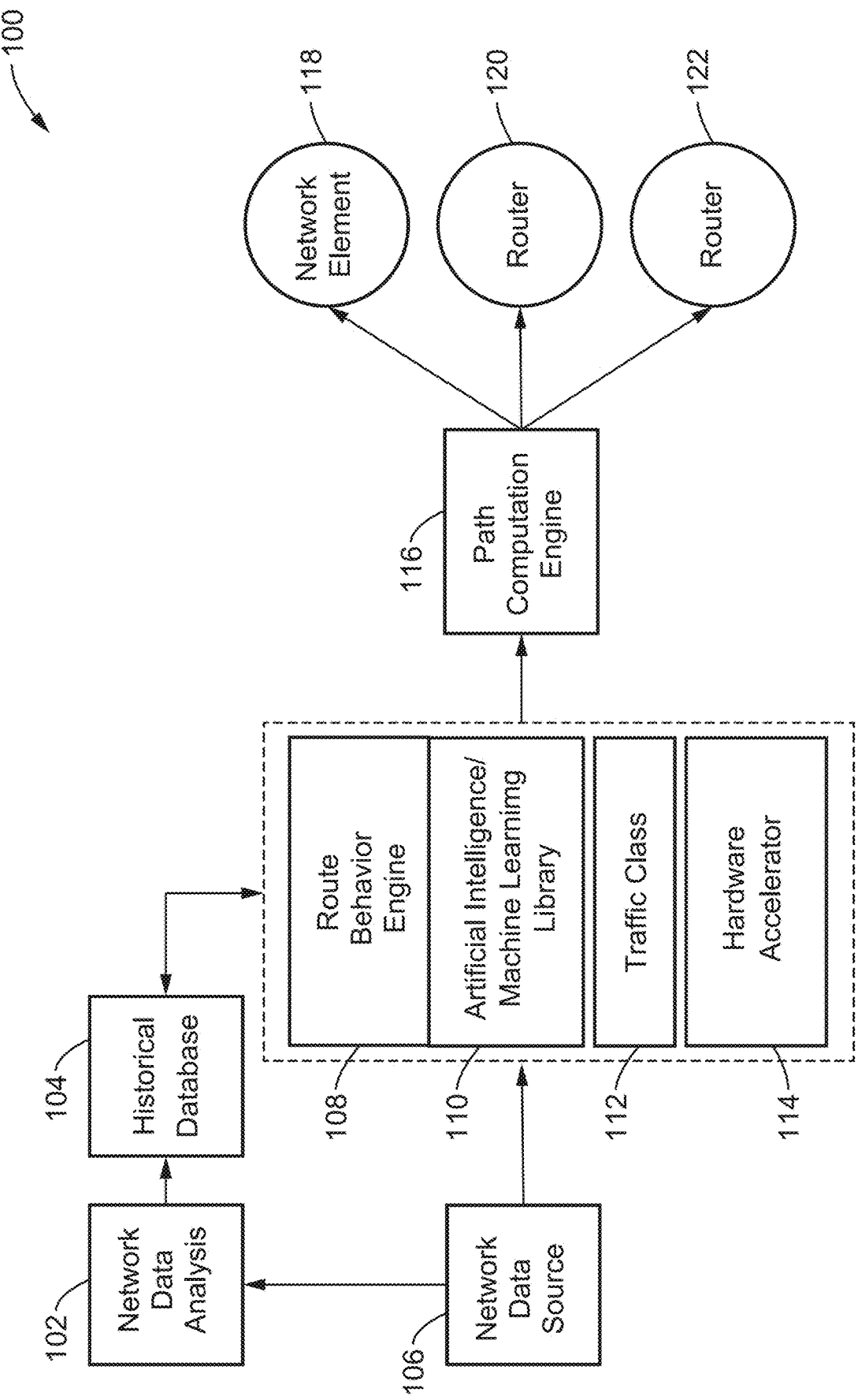
FIG. 1 is a topological graph of the Hecate structure according to an embodiment of the presented technology.

Refer now to FIG. 1, which is a topological graph 100 of the Hecate structure. This graph 100 describes the general workflow for gathering of network health data as well as traffic classification of historical site behavior. This information is fed to AI/ML (Artificial Intelligence/Machine Learning) libraries, which predict future health information (using optional hardware acceleration). Predictions and historical site characteristics are re-fed to the Graph Neural Network (GNN) component of the AI/ML libraries which creates a Predicted and Optimal solution. The Route Behavior Engine (RBE) then takes this information and passes it to the Path Computation Engine (PCE) which controls aggregate network behavior.

The Network Data Analysis 102 block is where the raw site/flow data is clustered and processed to create endpoint behaviors from network data source flow information as well as any post processing that needs to happen with the health data.

The Historical Database 104 block keeps track of recent health information from the Network Data Analysis (NDA) 102 block. Querying against this will also create a buffer of recent information in the event that issues come up with measurement availability. In addition, any other computation that needs to happen can run against this to minimize performance impact on the data infrastructure.

The Network Data Source 106 block contains two major data types. The first data type would be flow related data designed to characterize long term destination behavior. Examples of such flow might be jumbo or mice flows, which are identified and subsequently tagged. The second data type would be network health data, examples of which would include latency, loss, and jitter. This network health data is more transient than flow related data.

The Route Behavior Engine (RBE) 108 accomplishes two major things: 1) network health prediction, where future health information is predicted based on historical behavior; and 2) the network health predictions are combined with endpoint characteristics to provide optimal routing solutions.

The artificial intelligence/machine learning (AI/ML) Library layer 110 contains optimization and prediction code that is called by the Route Behavior Engine 108. This layer contains any machine learning algorithms designed for networks, such as: 1) traffic Prediction using Deep Learning methods like Long-Short Term Memory (LSTM) and Graph Neural Networks (GNNs) to help predict future network states; 2) traffic classification algorithms that include decision trees, K-means clustering and deep learning based methods, which also includes unsupervised classification techniques; and 3) regression and forecasting methods in general for time-series data sets. These models are continually upgraded as better prediction accuracies are discovered.

The Traffic Class layer 112 contains the unsupervised clustering algorithm used to classify endpoint behavior characteristics. A traffic class helps group related flows into groups such that group based actions can be performed. The following traffic classes have been identified for the purpose of Hecate and can be extended in the future:

1) long-living flows (also called elephant or jumbo flows), which contain large amounts of big data transfers lasting from a few hours to multiple days;
2) short-lived flows (also called mice or interactive flows); which contain short amounts of "bursty" data transfers, or shorter, potentially (although not necessarily) independent data flows that may occur at regular or irregular intervals containing smaller amounts of data or real-time, interactive information;
3) low-latency traffic flows, these flows require low latency and minimum packet loss;
4) priority flows, which can be prioritized over other flows in the network;
5) high throughput flows, these flows require high bandwidth;
6) intent-based flows, which have particular conditions attached to them such as deadlines, forbidden paths and required network characteristics; and
7) default flows with no requirements attached.

The Hardware Accelerator may be used for both the AI/ML Library 110 as well as the Traffic Class 112 code to provide quick computations to produce the predicted and optimized network state solutions. Large parts of the solution generators can run on the Hardware Acceleration hardware here. Such hardware accelerators include devices such as graphical processing units (GPUs) and field programmable gate array (FPGA) integrations with artificial intelligence (AI).

The Path Computation Engine (PCE) 116 represents the network routing controller that takes the optimized suggestions from the Route Behavior Engine (RBE) and outputs them to the various routing network elements 118/routers 120, 122 using their native communication protocols. This RBE unit is specific to the PCE being used with the deployment.

Routers are a specific type of network element 118, which are the actual systems used to route traffic from one location to another.

Figure 2:
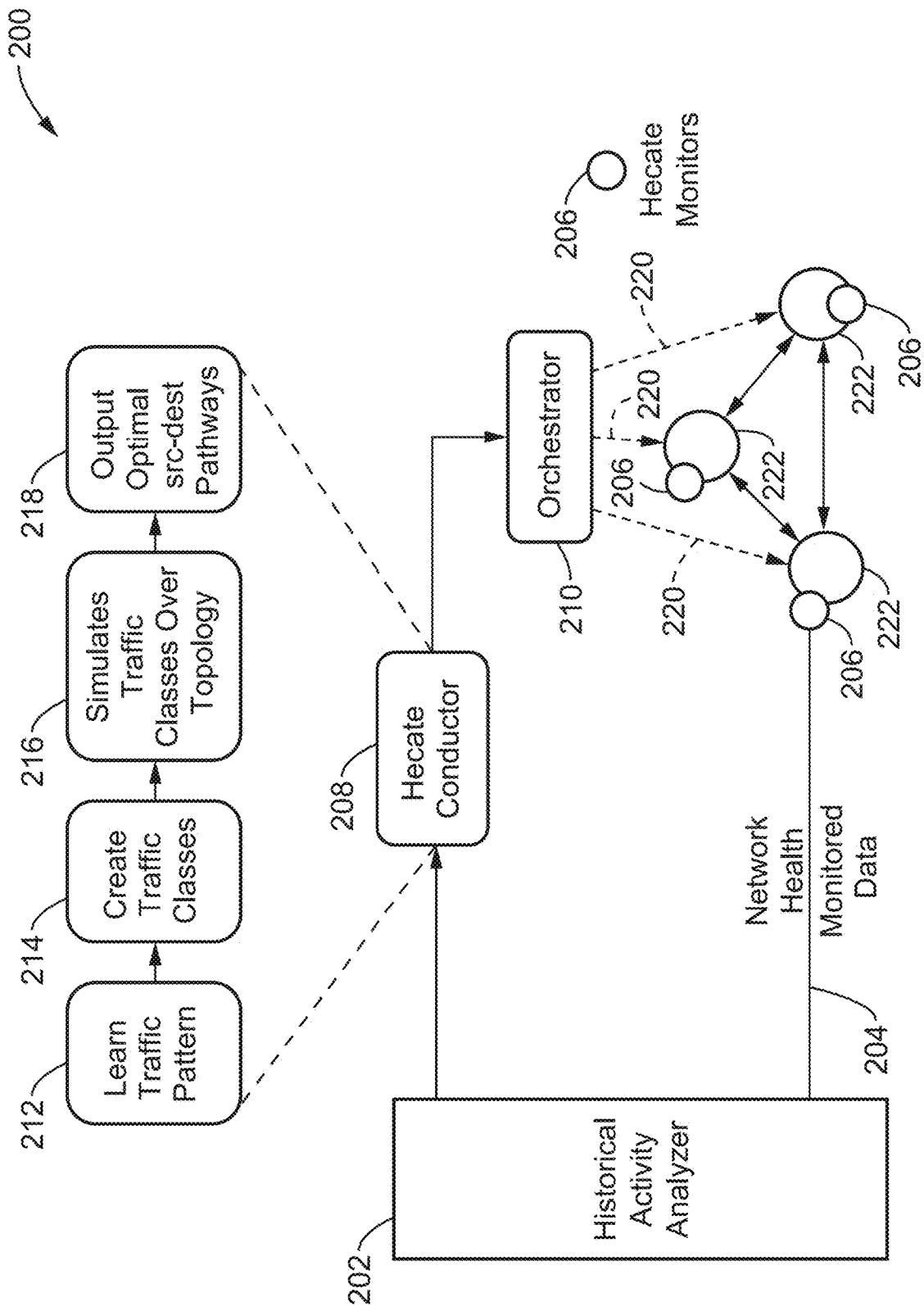
FIG. 2 is a topological graph of the general workflow operation of Hecate according to an embodiment of the presented technology.

Refer now to FIG. 2, which is a topological graph 200 of the general workflow operation of Hecate. Initially, a historical activity analyzer 202 is used to analyze select network flow records are analyzed to identify large and small network flows. Next, network health data (such as latency, loss, throughput) is read from network characteristics, known as Network Health Monitored Data 204 and Hecate monitors 206, then used to predict future values. These two data sources are fed to the simulator Graph Neural Network (GNN) which provides an optimal solution for source-destination (src-dest) pathways.

The Hecate Conductor 208 component takes the optimization characteristics derived from "Output optimal src-dest pathways" in the Historical Activity Analyzer 202 and communicates them to the network Orchestrator 210 via application package interface (API) or communication protocol. The Hecate Conductor 208 has several functional components: Learn Traffic Patterns 212, Create Traffic Classes 214, Simulate Traffic Classes Over Topology 216, Output Optimal src-dest Pathways 218.

Learn Traffic Patterns 212 represents the general process of taking (passive) information about the network and end sites and learning representative traffic classes in the flow statistics.

Create Traffic Classes 214 is the next step, where pre-processing the information for consumption by the Artificial Intelligence (AI) instance. This includes both unsupervised clustering for the flow/site data as well as any processing required for the health information.

Simulates Traffic Classes Over Topology 216 is the first step in the processing pipeline, which includes the application of predictions for future health characteristics in the network.

Output Optimal src-dest Pathways 218 is the next step for the optimization of path selection based on the health predictions as well as the site-based characteristics derived from "Create Traffic Classes" 214.

The Orchestrator 210 communicates 212 routing actions directly to the network elements 222 or via source routing.

The Hecate monitors 206 are points on the network from where health data can be accessed. The monitors 206 also identify the forecasting process for future health expectations.

The Network Health Monitored Data 204 is the link back from the Health Monitors 206 to the data storage and analysis components in Learn Traffic Patterns 212.

Figure 3:
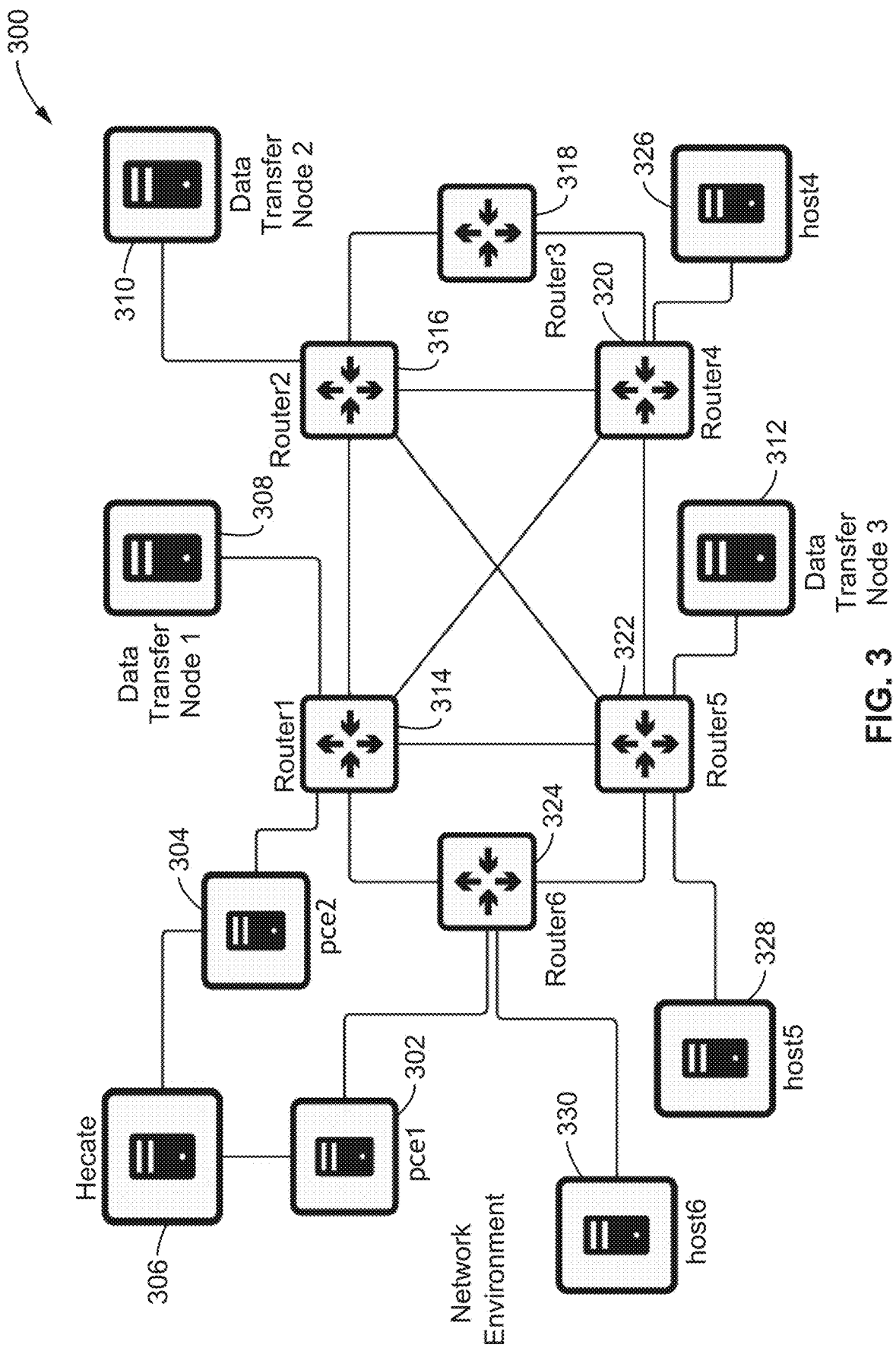
FIG. 3 is a graph of the general topology for initial experimental testing of the basic Hecate principles according to an embodiment of the presented technology.

Refer now to FIG. 3, which is a graph 300 of the general topology for initial experimental testing of the basic Hecate principles. Data moved between data transfer node (DTN) instances, with and without optimizations. The results indicate much more even distribution of link usage.

Here, pce1 302 and pce2 304 refer to sample Path Computation Engine (pce) back ends. pce1 302 and pce2 304 do not directly communicate with the routing instances.

A Hecate monitor 306 communicates with the pce1 302 and pce2 304 back ends. A traffic coordinator within Hecate monitor 306 communicates with the pce1 302 and pce2 304 elements to control network communication.

Data Transfer Node 1 308, Data Transfer Node 2 310, and Data Transfer Node 3 312 are systems optimized to move large data files quickly.

Router 1 314, Router 2 316, Router 3 318, Router 4 320, Router 5 322, and Router 6 324 are routing instances that take direction from the traffic coordinator.

host3 326, host4 328, and host6 330 are hosts, used here to represent network endpoints. Any of these hosts may be used as a source or destination for a network data traffic flow.

Figure 4:
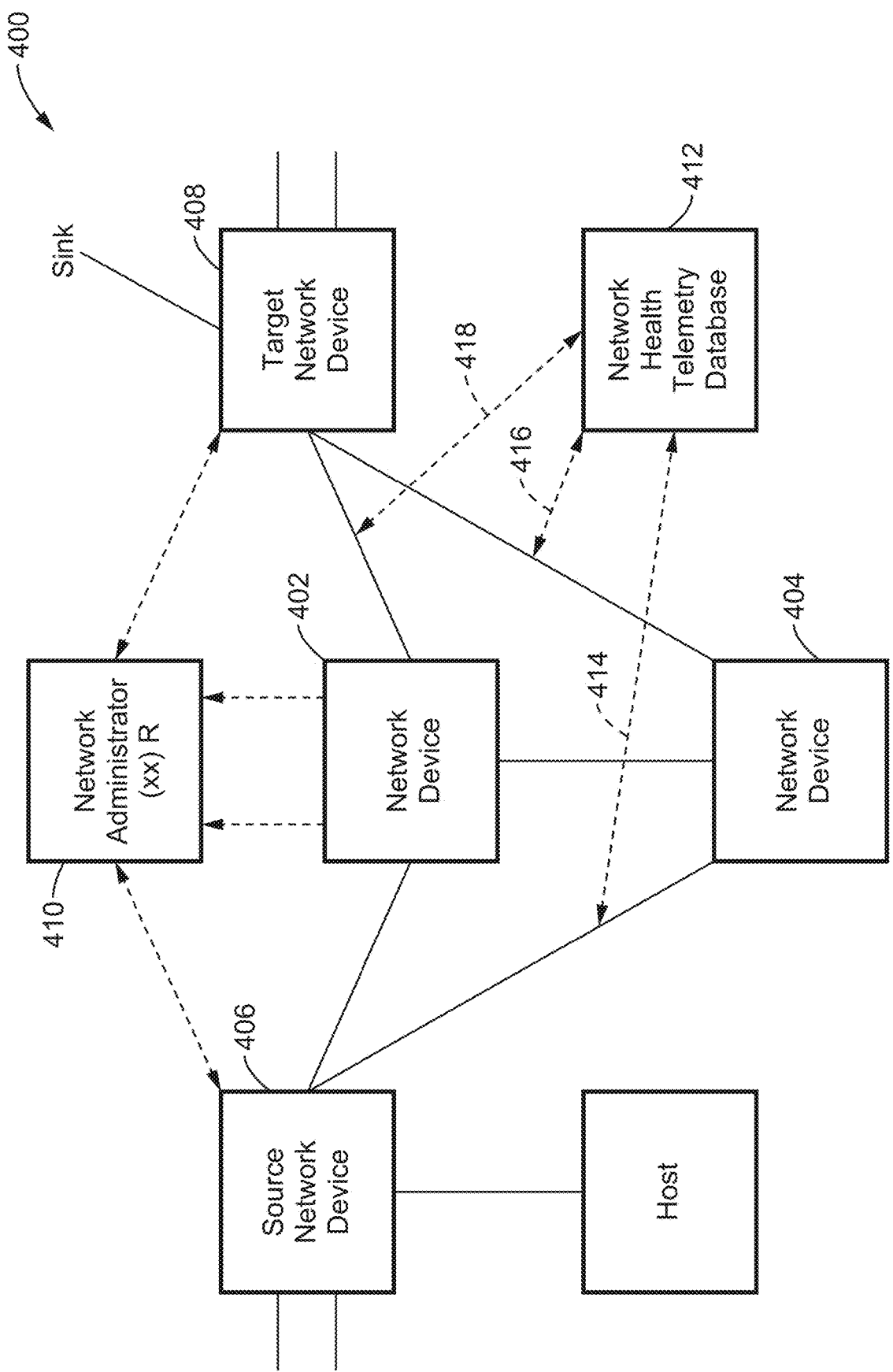
FIG. 4 shows an example of a traffic engineering tool to allow the network to self-learn how to optimize the paths for the traffic profiles it witnesses according to an embodiment of the presented technology.

Refer now to FIG. 4, which shows 400 an example of a traffic engineering tool to allow the network to self-learn how to optimize the paths for the traffic profiles it witnesses. As shown in FIG. 4, a distributed network of multiple network devices 402, 404 have a source 406 and destination 408) where a traffic flow has to move from source 406 to destination 408. A network administrator 410 collects real-time data from the devices 402, 404, 406, and 408. Additionally, there is a network database 412 collecting information of the network health telemetry data from the network links 414, 416, and 418. The sensors on these links collect information on bandwidth current utilization and network performance characteristics such as loss, throughput, and latency.

Figure 5:
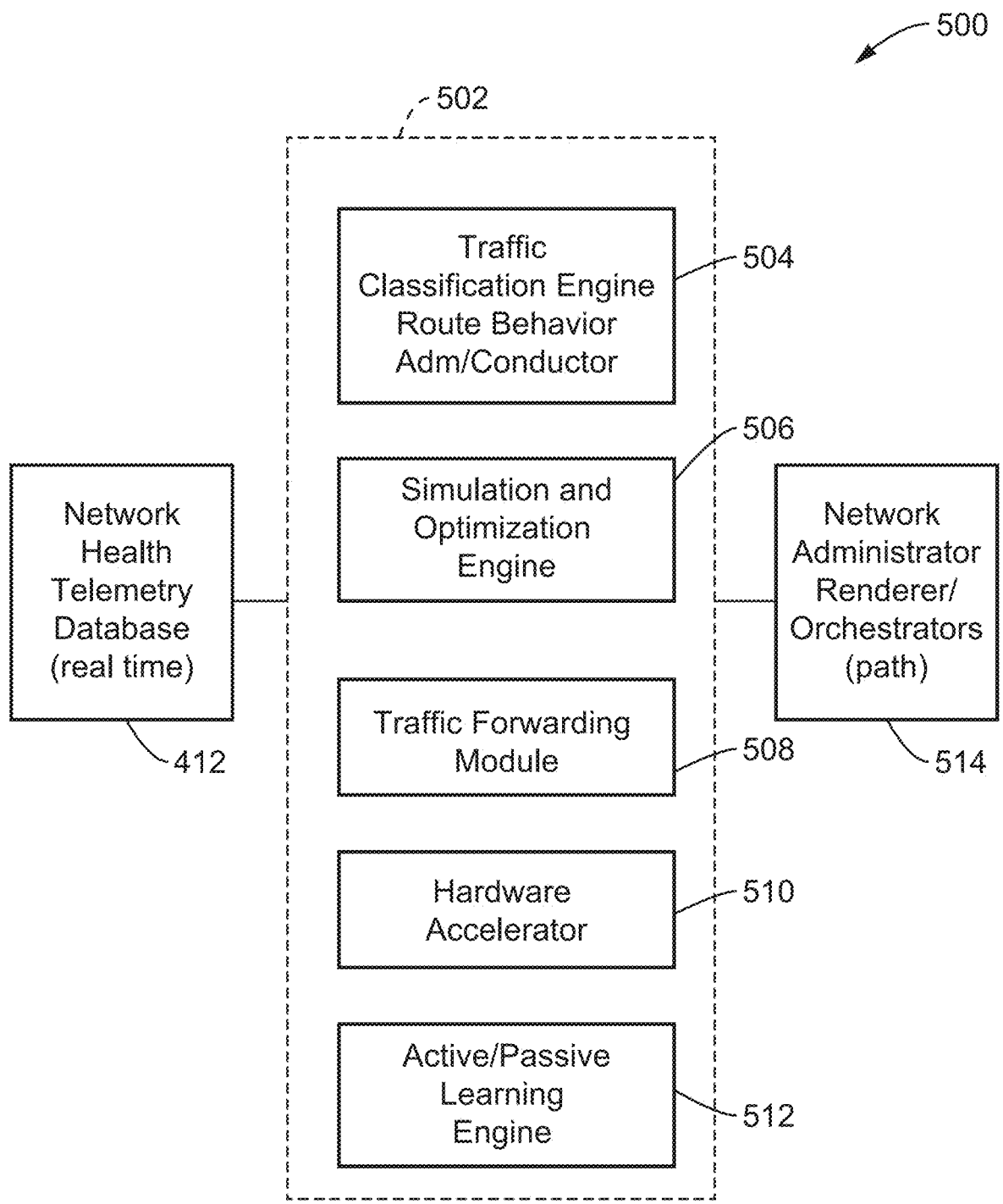
FIG. 5 shows an example where the network telemetry database connects to a route behavior conductor, which contains a traffic classification engine, a simulation and optimization engine, a traffic forwarding module, a hardware accelerator, and an active and/or passive learning engine, according to an embodiment of the presented technology.

FIG. 5 shows an example 500 where the network telemetry database 412 connects to a route behavior conductor 502, which contains a traffic classification engine 504, a simulation and optimization engine 506, a traffic forwarding module 508, a hardware accelerator 510, and an active and/or passive learning engine 512. This route behavior conductor 502 is also connected to a network administrator 514 or another renderer. In some embodiments, the route behavior conductor 502 performs some, a portion of, or all of the following functions: monitoring the network; analyzing the network data sets; planning actions given the network state; and executing a planned action by connecting to a network administrator 514 or orchestrator.

Figure 6:
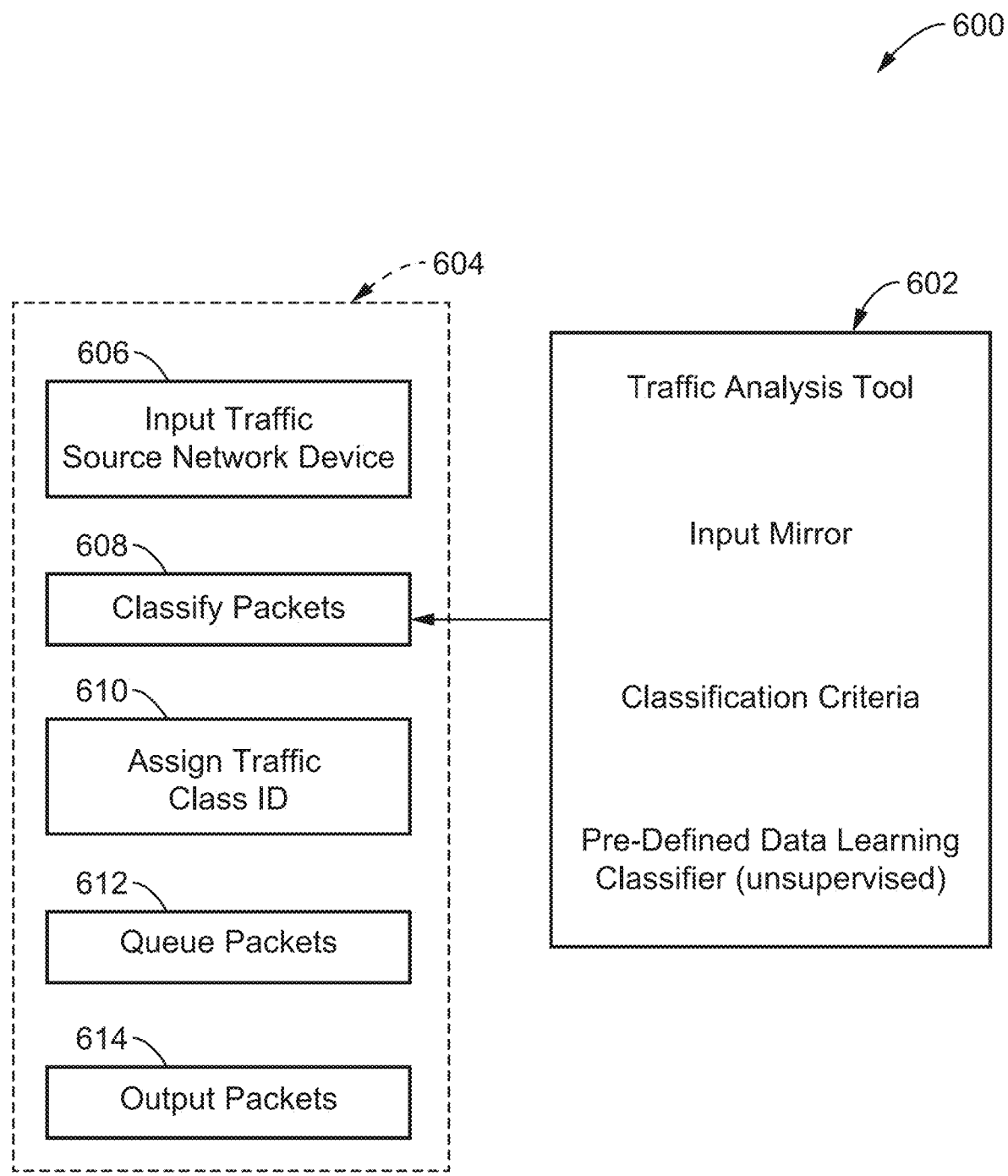
FIG. 6 shows an example of how traffic is tagged at a source according to an embodiment of the presented technology.

Refer now to FIG. 6, which shows an example of how traffic is tagged at a source 600. In the traffic analysis tool 602, traffic samples are chosen during a particular period of time (or time frame) and unsupervised clustering is performed to identify the dominant traffic characteristics. These samples will help classify incoming traffic flows and classify them in real-time. A traffic ID is assigned, which helps to push the packets into a queue and be prioritized based on the basis of the traffic ID. The priority will be matched with the rules from the optimizer to help push the traffic on dynamically assigned paths.

The detailed operation 604 of the traffic analysis tool 602 is now described in more detail. Input traffic from a source network device is monitored 606. Next, the input traffic is analyzed by classifying the data packets 608. A traffic class ID is then assigned 610. The input traffic, which is comprised of data packets next has its packet queued 612. After the packets are queued 612, the resultant packets are output 614 based on their output priority. The traffic ID helps to push the packets into the queue and be prioritized based on the particular priority of the traffic ID. The priority of an individual packet will be matched with the rules from an optimizer to help push the traffic on their dynamically assigned paths.

The traffic analysis tool 602 comprises a neural network designed to optimize traffic routing and packet transmission prioritization.

Figure 7:
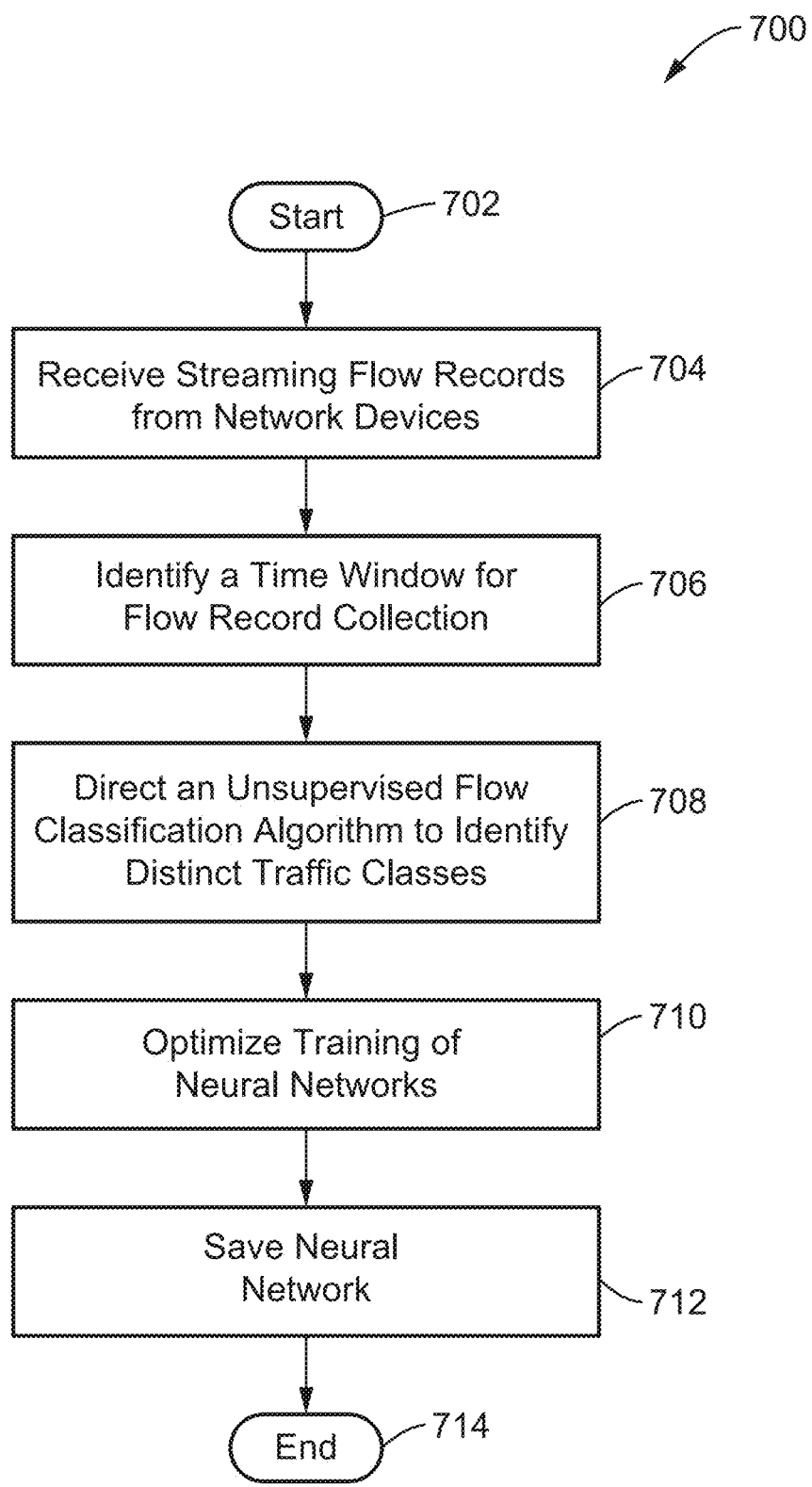
FIG. 7 is a flowchart describing the training of the neural network of the traffic analysis tool according to an embodiment of the presented technology

Refer now to FIG. 7, which is a flowchart describing the training of the neural network of the traffic analysis tool 700. The training begins 702 with receiving 704 streaming flow records from the various monitored network devices (see FIG. 2 206). Next, a time window is identified for flow record collection 706. An unsupervised flow algorithm is then directed to identify the flow records into distinct traffic classes 708. The resulting traffic classes are then used to optimize the training of a traffic analysis neural network 710. After suitable training of the traffic analysis neural network, the resulting neural network is saved 712, and the traffic analysis tool 700 is then considered trained 714.

Figure 8:
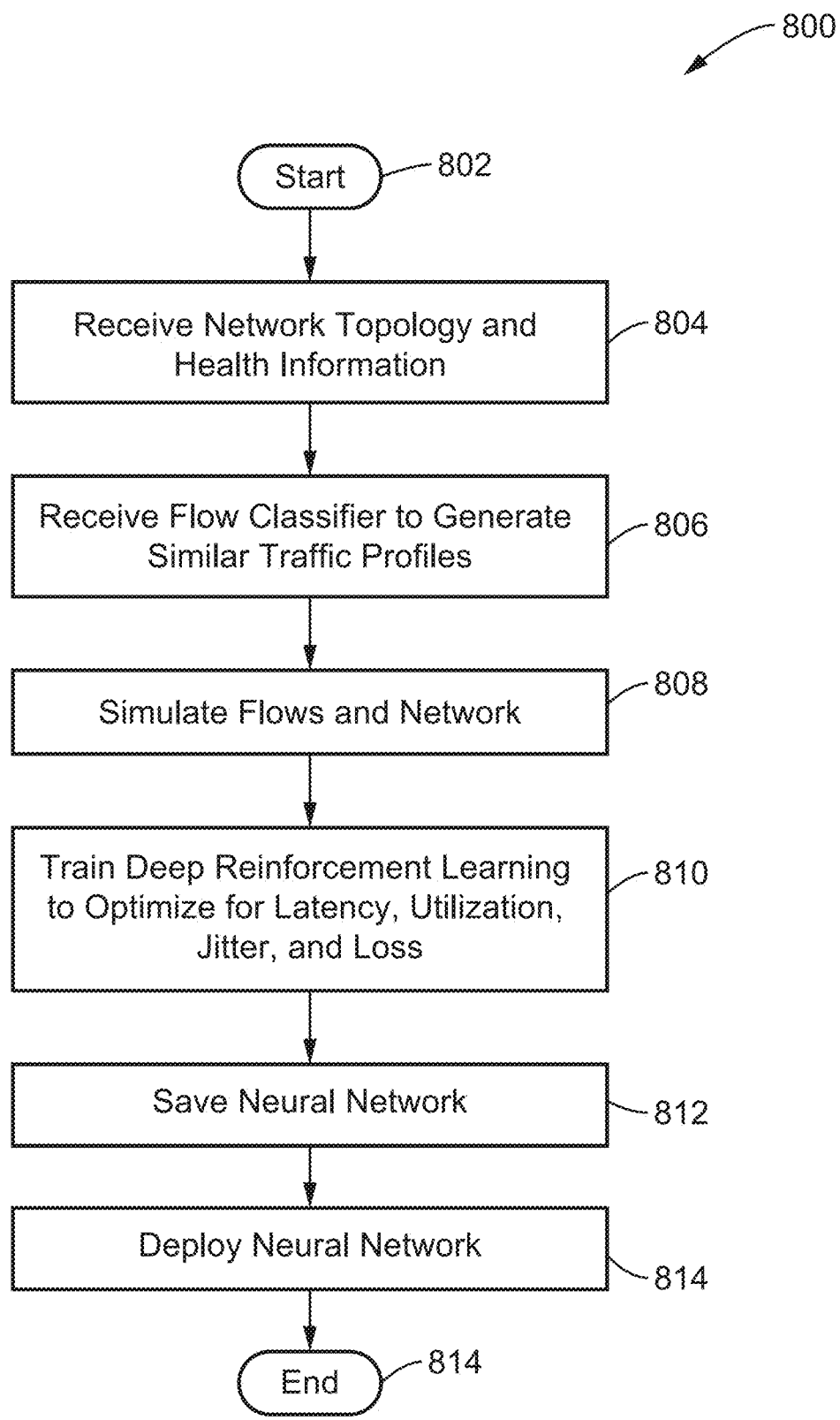
FIG. 8 is a flowchart of how the traffic analysis tool is implemented in a system according to an embodiment of the presented technology.

Refer now to FIG. 8, which is a flowchart 800 of how the traffic analysis tool is implemented in a system. Initially, 802, the network topology and health information is received 804. Next, the flow classifiers are received and used to generate similar traffic profiles 806. The flows and network are them simulated 808, and used to train a deep reinforcement learning neural network to optimize the traffic for latency, utilization, and loss 810. The resulting deep learning neural network is then saved 812. Once save, the deep learning neural network is deployed 814, and the process completes 816.

Figure 9:
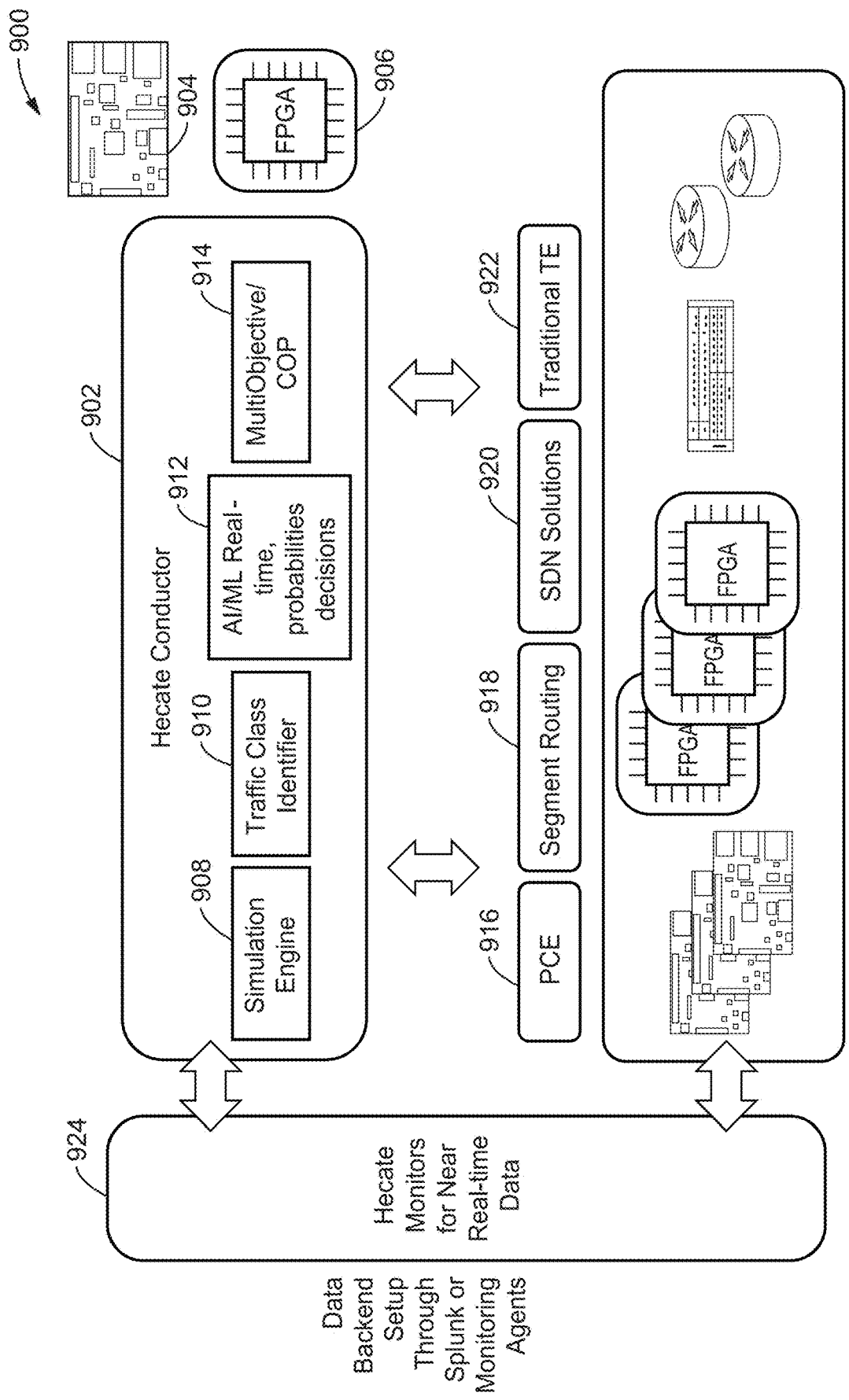
FIG. 9 is a high-level architectural diagram of the Hecate system according to an embodiment of the presented technology.

Refer now to FIG. 9, which is a high-level architectural diagram 900 of the Hecate system. The Hecate Conductor 902 can be run on a Raspberry Pi 904, field programmable gate array (FPGA) 906, or other suitable hardware. Such an implementation allows part of the functions to be processed at better speed on additional hardware and then communicated back to the network as needed. Hecate is preferably implemented in hardware to prevent any problems that could arise with looping or adaptive routing.

The Hecate Conductor 902 may be thought to comprise a Simulation Engine 908, Traffic Class Identifier 910, an artificial intelligence/machine learning (AI/ML) component capable of real time analyses, probability assessment, and decision-making regarding network flow 912, and a multi-objective Common Operating Platform (COP) 914.

The Hecate Conductor 902 may be used integrated into the network infrastructure with relative ease by interacting with renderers such as a Path Computational Engine (PCE).

Both hardware and software components of the Hecate platform are intended for use in large data network environments where there exist multiple paths of the same or varying attributes that require traffic engineering such as autonomous traffic re-routing based on a combination of learned, evolving network attributes such as traffic flow, environmental, topological, chronological, or other user defined attributes. Integration into existing infrastructure is twofold:

1) The technology platform is provided access to existing network data such as netflow, sFlow, streamed telemetry, or other network traffic flow data such as latency metrics from high fidelity latency tools (OWAMP, TWAMP), and interface counter data (via SNMP).
2) This data is indexed and fed to the software algorithms and associated field programmable gate array (FPGA) or graphics processing unit (GPU) hardware for processing and assisted learning. By leveraging existing and standard data sets inclusive of nearly all network hardware, integration into existing environments becomes trivial.

Once the platform has access to enough data for an initial optimization pass, it can be connected to a Path Computational Engine (PCE) 916 that will provide the platform with the following:

1) Access to a real time or near real time view of the entire network topology;
2) When provided with the appropriate permissions, the ability to create optimized paths that conform to the administrative policy for traffic dictated by the engineers through said topology; and
3) A feedback cycle to autonomously consume->learn->optimize->provision the traffic policy.

The Hecate platform is designed to be deployable in the vast majority of modern networks. It contains a modular design model, but operates by default with a segment routing controller 918, segment defining networking (SDN) 920, or traditional traffic engineering (TE) 922 systems.

We have taken a complex problem of using AI to optimize network traffic engineering and reduced it to a practical solution!

Installation Guide:

Hecate can be easily integrated into an existing network by leveraging existing data sources and commercially available hardware and software.

In order to deploy Hecate into an existing network, it is necessary to provide data sources and, ideally, historical data to bootstrap the learning process. This can be accomplished by providing Hecate with a view into existing standard netflow, sflow, or other traffic flow information. This is typically accomplished by Hecate monitors 924 connected to the network of interest for near real-time data. The Hecate monitors 924 may incorporate a backend data setup through Splunk or other monitoring agents.

The Hecate Conductor, implemented by Raspberry pi module, FPGA, or other systems, is then connected to a Renderer agent that then communicates to the Path Computational Engine (PCE) 916.

EXAMPLE 1

Hecate is a technology that enables self-driving networks. The definition used here of a self-driving network is focused on a network that can optimize traffic engineering challenges, such as distributing the network traffic load, reducing congestion points and packet loss and improving flow completion times.

Industry Background

Traffic optimization and path computation is a challenging task for network engineers. Technologies such as Google's B4, SWAN and MPLS-TE require meticulously designed heuristics to calculate optimal routing strategies and do not take into account traffic characteristics or long and short-term trends. To keep up with the continuous growing demand, network providers spend millions of dollars both augmenting the network with more links and understanding how they can efficiently use the capacity they already possess. Additionally, every network is used for different kinds of applications that present a variety of network performance demands. Optimizing capacity at the same time as addressing application performance is highly desirable and a priority for network providers.

Major network providers (e.g., AT&T, Verizon, Lumen, Zayo), cloud computing companies (e.g., Google, Amazon) and content providers (e.g., Netflix, LimeLight), build, lease and manage their own networks to make sure users are getting optimal service. In research and education (R&E) networks (e.g., ESnet), networks are also built and maintained to provide optimum performance to the scientific community.

Hecate

As a result of the continuing work on network path and traffic optimization, Hecate has been developed and demonstrated, a revolutionary AI-driven solution that uses data-driven deep reinforcement learning on traffic characteristics, network conditions, and historical behaviors to determine optimal traffic engineering patterns. Hecate is designed as a stand-alone system that can be plugged into existing or new deployment network architectures to optimize their traffic engineering efforts without excessive human interaction.

Additionally, real network statistics from ESnet have been analyzed and found that, due to the complex network traffic patterns, most network links are not being utilized at the full extent. There is a lot of underutilization, potential for congestion, which leads to packet loss. Hecate is designed to resolve these issues by using AI to build a better traffic engineering solution.

Hecate is a tool that studies the traffic patterns on the network and network health to optimize the network. Hecate uses a mix of deep learning models, classification, model-based and model-free learning to optimize the network. As part of this process, Hecate also classifies observed traffic into categories based on that traffics behavior, to help it manage the traffic better for application specific performance.

EXAMPLE 2

Hecate: AI-Driven WAN Traffic Engineering for Science

Abstract—Science network traffic, captured from experiments such as the Large Hadron Collider, are significantly different than general internet traffic in data size, complexity and performance requirements. To deal with this complexity, Research & Education networks (R&E) like ESnet are specifically designed to carry science traffic across the world to other R&E networks, laboratories, and experiments. Designing optimum network topologies, where traffic flow is always efficient with minimal congestion points is imperative to guarantee successful science experimentations. In ESnet, a large percentage of long-running flows are seen, mixed in with deadline-driven flows and remote analysis, which makes traffic engineering (TE) particularly challenging. In this Example II, a diversion from traditional TE approaches uses AI to improve real-time traffic path control such to improve flow quality and network performance proposing a deployable solution, Hecate. Hecate performs a two-stage optimization process, first learning traffic profiles and network health data to predict future statistics, and second, by leveraging deep reinforcement learning to optimize path routing over many optimization objectives. Hecate is designed to optimize network utilization and performance to reduce network hotspots over an operational network.

I. Introduction

The vision for a self-driving network imagines a network that combines telemetry, automation, dev-ops and machine learning to construct an infrastructure that is responsive, adaptive and predictive. While Juniper Networks argues that a self-driving network has AI integrated into all network decisions, little is described how a self-driving network can be achieved. In this Example, a self-driving network is visualized to be an amalgamation of multiple AI capabilities integrated with the networking infrastructure, that can perform various functions to improve various network aspects such as performance, and traffic engineering. To this extent, the AI-engine Hecate described herein specifically caters to the traffic engineering component in a self-driving network.

Software defined networking (SDN) allows some control over data and control planes, but comes with additional processing overhead and device management. Industry efforts, such as Google and OpenStack, use SDN to optimize administrative control, reroute and manage networks across multi-cloud sites, and to improve cross-organization communications. By separating data and control planes, SDN controllers have more knowledge and use network virtualization to dynamically manage switches and flows. More recent approaches such as segment routing (SR) are becoming popular for optimizing routing tables by using header segment updates to 'guide' the flow through the network. Merging these techniques with machine learning allows engineers to translate ML decision making on the network, allowing for traffic engineering up-dates and optimization. Within this Example II, the terms "Traffic engineering" and "Path optimization" are used somewhat loosely. Path optimization is a specific example of a methodology for the broader topic of traffic engineering.

Why traffic engineering for Science WAN? While optimizing the WAN backbone traffic is a well-researched problem, for example optimizing OSPF, IS-IS and industry efforts Google's B4 and SWAN; these solutions often are designed on mathematical frameworks of queuing theory, Monte Carlo simulations, and other statistical techniques that assume a global view of the whole network. Additionally, these network backbones often handle commodity internet traffic, which is diurnally periodic in nature, peaking during the day and less in the night. These simple predictions work with the TE decisions make on a global network view. In R&E networks, the TE problem becomes more challenging because: (1) Large Science traffic flows are often random, peaking when large facilities run or have a number of sudden large data transfers, (2) Science traffic is very variable with many performance requirements such as deadline-driven transfers, low-latency transfers and long-living flows that often clog up the network and (3) Network performance is extremely critical to prevent loss, because loosing packets, can seriously jeopardize science results being collected over very massive and expensive lab facilities.

Figure 10:
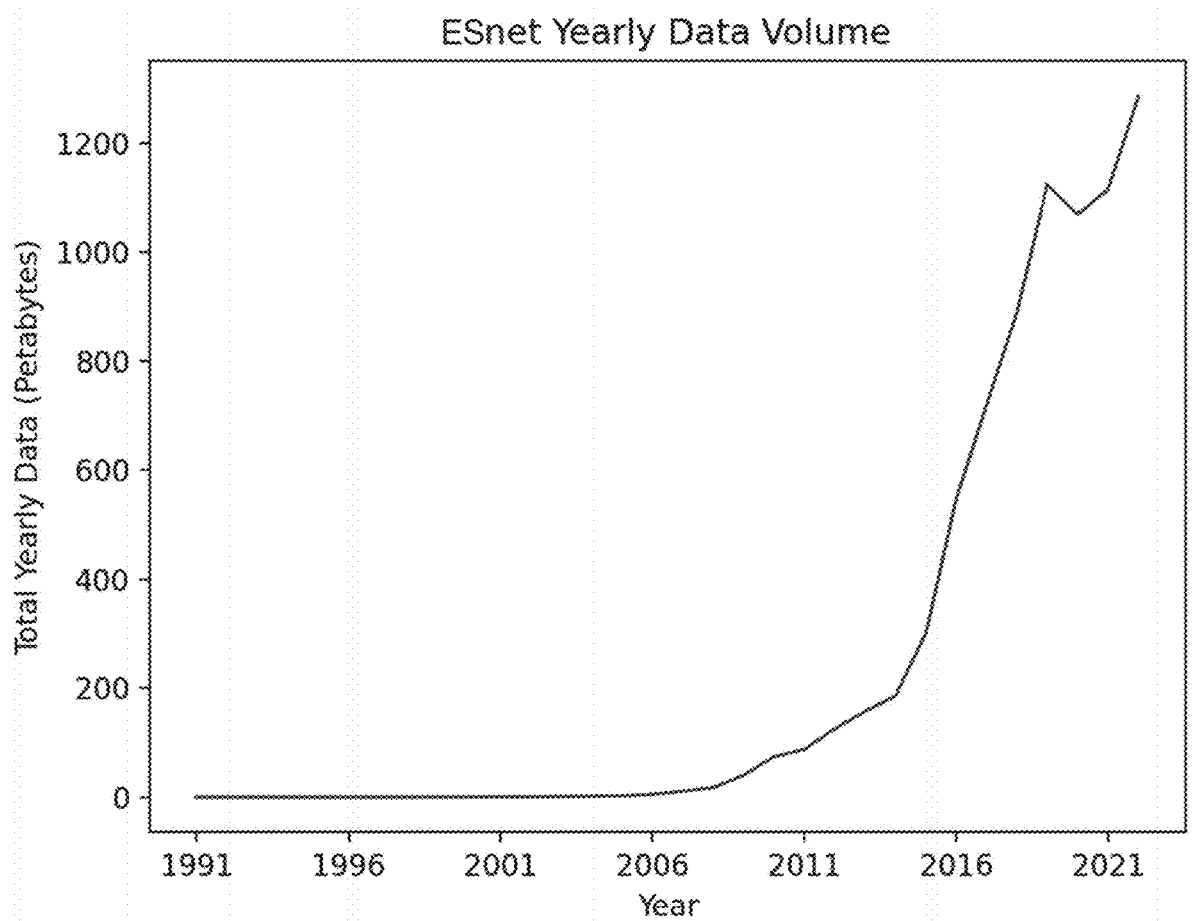
FIG. 10 is a graph of Network Resource Usage from 2018-2022.

FIG. 10 shows a graph of data volume across ESnet (www.es.net) from 1991-2022, showing near-exponential growth of traffic volume across the network. ESnet also caps network bandwidth at 40%, to reduce hotspots created from traffic bursts. This prevents congestion and loss, but also leads to a highly underutilized network. Continually upgrading the network for greater capacity as traffic grows is a very expensive solution, so there is a need to think of innovative ways in which the network resources could be utilized closer to 100%, while being resilient to congestion and packet loss. With the surge of AI and its proof in helping solve complex problems such as self-driving cars, AlphaGo or complex protein structures, there are multiple efforts exploring AI in helping with traffic engineering. Utilizing real-time network monitoring data such as traffic profiles across links, volume studies, flow characteristics—can all help develop an improved congestion-free traffic engineering solution such that flow performance is improved and resources are better utilized.

Many solutions have used mathematical foundations, such as queuing theory and Poisson distribution to estimate traffic profiles for TE solutions. However, as network traffic is extremely dynamic, these handcrafted heuristics often diverge from observed network behavior and need to be redesigned. Recent efforts to use AI such as deep reinforcement learning (DRL) to explore optimal routing solutions have seen some success in coming up with innovative solutions. Our previous work DeepRoute showed an AI agent using the greedy Q-learning to simulate networks and learn optimal routing strategies such as minimizing flow completion time. However, DRL approaches are difficult to verify as there is no ground truth to compare performance, and it is also difficult to deploy these in real-world network technologies. In DeepRoute, the AI agent needed enough experience to know optimal routing strategies per flow, but with network upgrades and reconfiguration, the AI agent quickly became obsolete needing a refresh constantly. In the work here with Hecate, the lessons learned in DeepRoute and design a DRL agent that incorporates prediction (using a graph neural network (GNN)) are built upon to improve TE solution efficiency and generalizing it to multiple traffic topologies and deployable solutions. Hecate utilizes information from traffic profiles, network topology and current network health data to build bespoke TE solutions for WAN, taking into account the dynamic nature of networks and reduces congestion hotspots. This Example makes the following contributions:

Hecate is proposed, a two-stage deployable solution that uses prediction and optimization (graph neural networks and deep reinforcement learning) to build efficient TE solutions that are deployable via path computation engines.

A graph neural network is showcased that is able to improve prediction accuracy for network health in near-real-time.

A search based on probabilistic graph search and DRL is used to learn optimal routes given certain SRC-DEST pairs.

Additional features such as learning traffic profiles and leveraging segment routing to push commands on the network.

II. Background and Motivation

Leveraging data-driven learning, deep reinforcement learning (DRL) can provide simple solutions to complex online decision making, like games or computing resource management. Techniques in path optimization include two main approaches (1) optimizing routing configurations by predicting future traffic conditions depending on current and past traffic patterns or (2) optimizing routing configurations based on the number of feasible traffic scenarios to improve performance parameters. In addition, current network conditions such as bandwidth, jitter, or latency over resource links, can be used to analyze offline models of the network topology and the traffic demand matrix to infer best paths between source-destination pairs. However, this approach leads to limitations in a dynamic network topology such as: (1) time to optimize as networks grow from 10s to 100s of routers, and (2) the requirement to recalculate the dynamic traffic demand matrix as links become congested and possibly fail. In order to prevent this, researchers have used prediction methods to extrapolate future conditions and use these to determine optimum paths. This approach is being compared to traditional path optimization methods which use meticulous heuristics that rely on having full knowledge of the system to design optimization algorithms. Recent solutions use DRL combined with local search to develop optimal TE solutions, but do not account for traffic profiles in their decision making.

A. Deep Reinforcement Learning for TE

Figure 11:
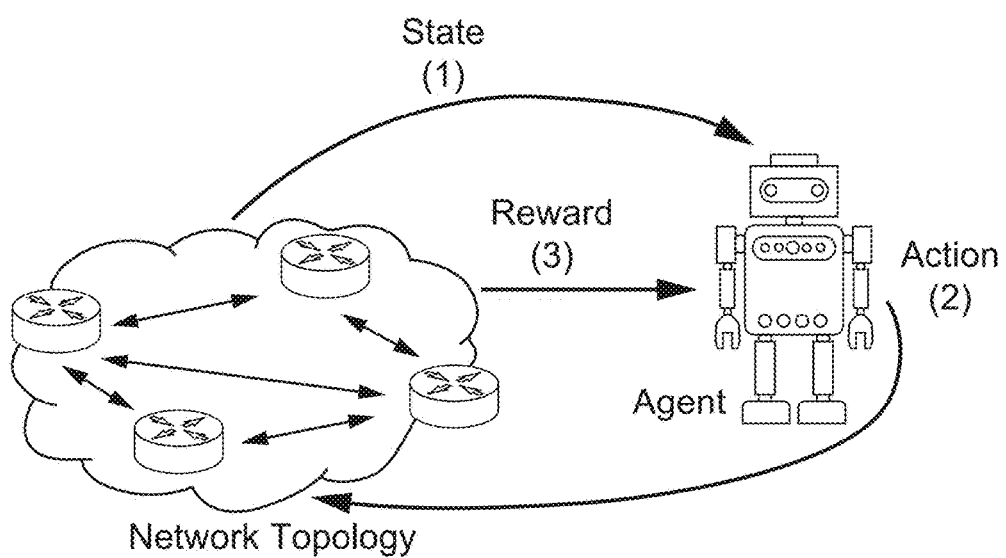
FIG. 11 is a depiction where DRL agent learns by observing the network and collecting rewards according to an embodiment of the presented technology.

Deep reinforcement learning (DRL) is a class of machine learning algorithms based on a trial-and-error learning approach. The DRL agent interacts with the environment, learning the dynamics by directly trying different control actions and observing the consequences through some rewards (FIG. 11). This typically involves the agent trying a significant number of actions (e.g., path selections, changing parameters) from a possible action space in the environment (e.g., network system) and receiving a reward (e.g., short flow completion time, or maximizing the number of flows transferred). The rewards indicate to the DRL agent how well a particular action succeeded with respect to some environmental condition (e.g., link congestion, traffic surge).

Assuming that the network is a fully observed collection of states, such that observation at time t is equal to state at time (i.e., $s_t$), the sequential interaction between the DRL agent and the environment can be modeled as a Markov decision process (MDP), which means the future state $s_{t+1}$ of the network are dependent on the current state $s_t$. Formally, for an MDP the state transition probability is defined as:

$$P(s_{t+1}|s_t,a_t,s_{t-1},a_{t-1},\ldots)=P(s_{t+1}|s_t,a_t) \quad (1)$$

An MDP is defined as a four-element tuple (S, A, P, R, γ), where S is the set of states of the environment, A is the set of possible actions, P is the state transition probability that describes the probability distribution of next steps ($s_{t+1}$) given the current state ($s_t$) and action (at), R is the reward function that provides the reward obtained of taking action at state $s_t$, and finally γ∈[0, 1] is a parameter that is called discount factor, which determines the importance of future rewards. If γ=0 the agent will be concerned only by maximizing immediate rewards, which means it will learn a control policy that selects actions to maximize $R_{t+1}$. As γ increases, the DRL agent becomes increasingly focused on the future rewards. Given an MDP, the DRL agent learns, by mapping the environment states to the actions, a control policy ($\pi(a_t|s_t)$: $S_t \to A_t$) that maximizes the expected cumulative reward at each time step (i.e., maximizing the expected cumulative reward it will receive in the future).

Model-based versus model-free RL: DRL algorithms can be subcategorized—model-based versus model-free algorithms. In model-based learning, the agent learns the system dynamics first and then uses the learned system dynamics for planning such as a prediction model; while model-free algorithm learns the optimal control without learning the system dynamics. The model-based algorithm is usually more computationally expensive, because the algorithm first needs to learn an accurate environment model, then it needs to find an optimal policy. Thus, model-free algorithms are more popular, as they are usually less computationally expensive. In routing problems, using a Google Map to plan out our route can be seen as a model-based approach. However, if the driver uses their past experience to choose a route at a particular time of the day, this serves as a model-free approach.

B. Challenges in Managing Science Flows

High performance networking requires balancing large numbers of small short-lived connections and small numbers of high-volume long-lived connections. Optimizing this balance is one of the reasons why we began exploring Hecate. Measuring data volume vs. connection duration, or connection count vs. connection duration is normally expressed using a Receiver Operator Characteristic (ROC) curve.

Figure 12:
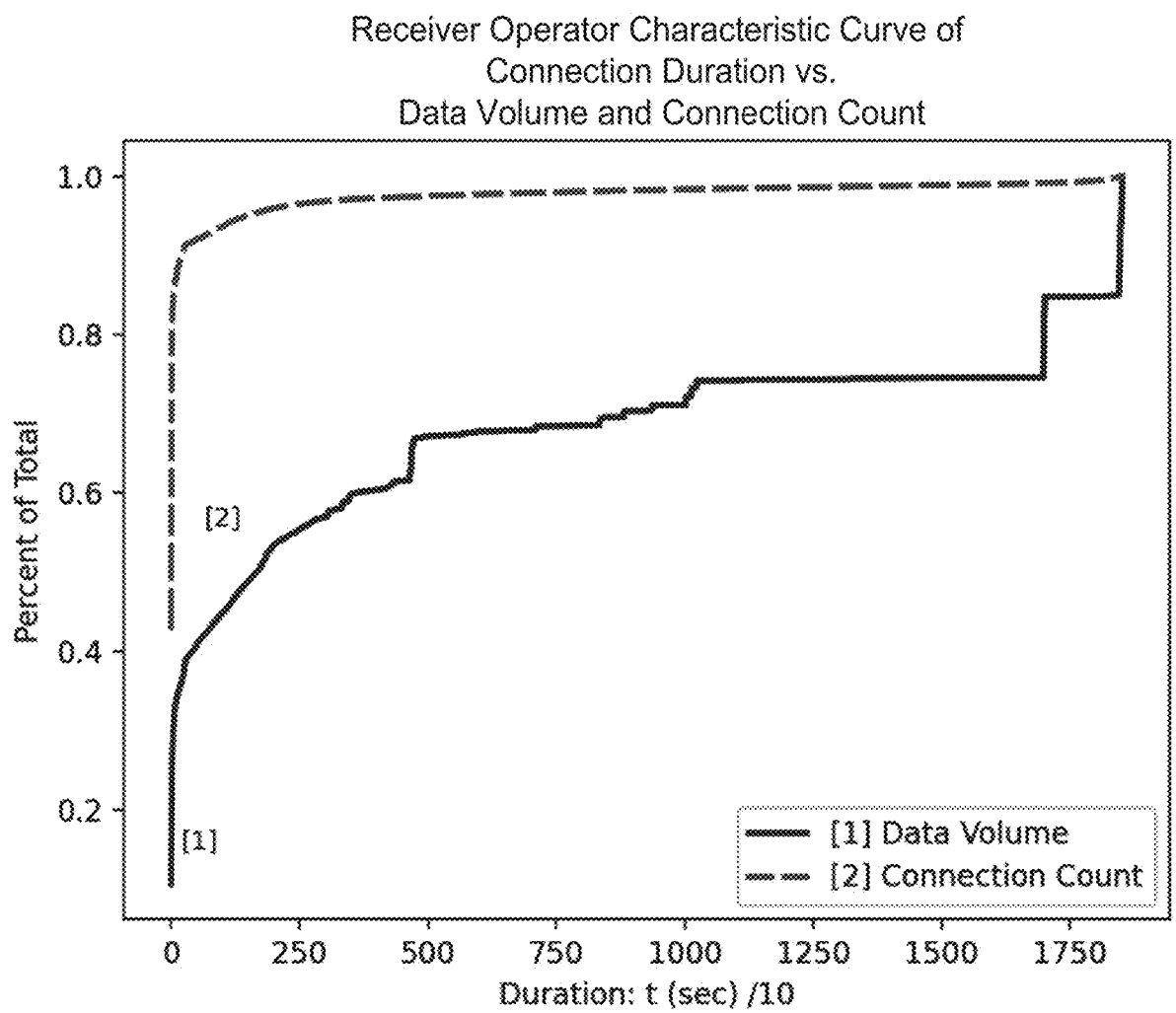
FIG. 12 is a Receiver Operator Characteristic (ROC) curve of connections and data volumes.

FIG. 12 displays three days of network traffic between the various sites found in FIG. 12. The connection duration is binned into 10 second chunks to allow for sufficient generalization without too much noise. Here, when the phrase "about the first 90%", it means the shortest 90% of all connections. With that in mind, it is seen that the first 90 percent of all connections carry 36 percent of the total data, while the last 0.0085 percent of all connections carry one third of the data. When looking at the high-performance computing facilities, this heavy tail is significantly more pronounced because of the very large data transfers.

Because of the sensitivity of long-lived TCP data transfers to packet loss, e.g., a 20× gap in performance between no loss and ½2k packet loss, making sure the small number of (unscheduled) high volume connections run cleanly without interfering with normal interactive traffic like video meetings or interactive cloud resources is critical and represents the problem that is attempting to be solved.

C. Network Optimization or Defining the Reward Function

The primary goal for network optimization is a ensure the best possible network design and performance while minimizing the total cost. In networks designed for supporting science, network performance optimization means keeping packet loss low, or optimizing for high/low-latency traffic. As a combinatory optimization challenge, coming up with bespoke solutions for each category of flow is a significant challenge. Specifically, the goal is looking at defining the reward function as optimizing one or more of the functions described in Table 1. Interactive path optimization for routing solutions is an area where advances in routing practices as well as machine learning can work together to create an opportunity for networks to be operated at higher utilization without interfering with the clean transfer of (data sets). At the application layer this can be worked around by utilizing more efficient congestion control, etc., but for the data carrier this just changes the equation a small amount. The real problem is that a production network is generally unable to operate at high utilization without packet loss under normal operating conditions without the presence of some traffic engineering mechanism.

III. Hecate's Data-Driven Learning

Hecate follows a two-step optimization process to develop efficient TE solutions. A core focus of this is the data enrichment pipeline used by the learning system. The overall workflow for the entire system can be seen in FIG. 14 and FIG. 15.

Figure 15:
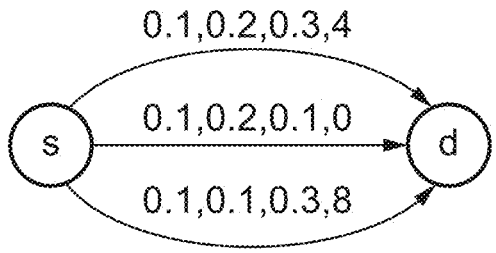
FIG. 15 is the same network of FIG. 14, with added information on latency, loss, jitter, current load.

In FIG. 15, a possible network with Hecate uses more information like latency, loss, jitter, current load to make decisions on which path to use.

A. Problem Definition

Figure 14:
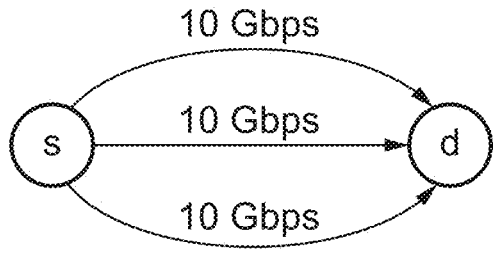
FIG. 14 is network of three links each with 10 Gbps bandwidth.

The challenge as stated is to provide a data driven solution to the classic TE problem, with multiple possible objectives for network optimization. FIG. 14 shows a simple network topology with associated information on network latency, loss and jitter (from perfSonar) and current load (recorded from SNMP router statistics). With this information a link can be chosen that will optimize the users specified objectives for traffic travelling between source s and destination d.

Figure 13:
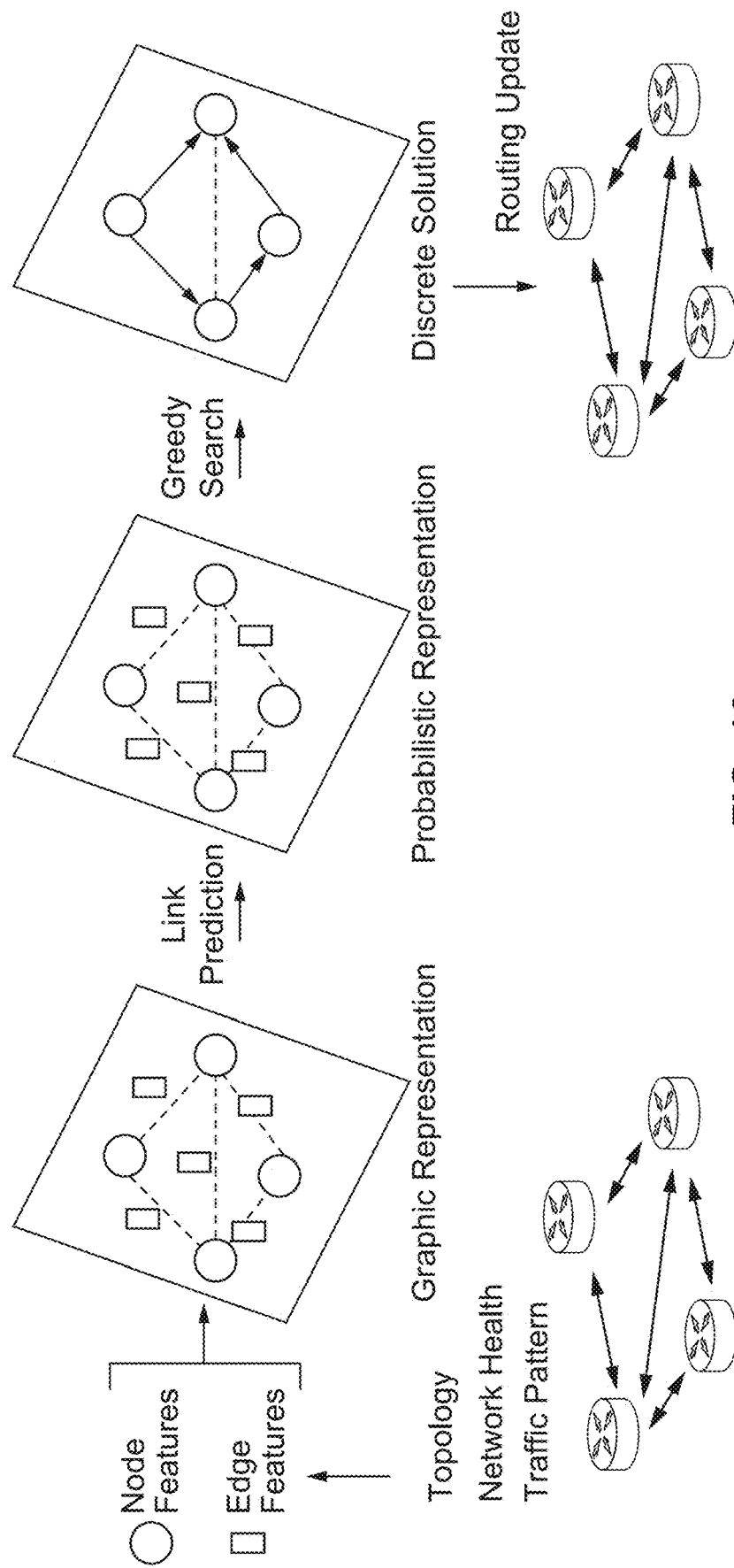
FIG. 13 is a Hecate data flow overview for two sites (S) and two routers (R) according to an embodiment of the presented technology.

This TE problem is defined as a graph (or traffic matrix) with nodes and edges represented as a graph neural network (GNN) (FIG. 13). The GNN performs link prediction of each of the four variables in the future predicting up to 24-hour ahead.

Further, once the predictions have been generated, Hecate uses a greedy search DRL algorithm to find optimal paths given a reward function that is needed to be optimized. Multiple reward functions can be chosen, allowing Hecate to work with the variable demands of different networks and their requirements. This part of the DRL can also be replaced by a probabilistic graph optimization algorithm and we perform a comparison between the two approaches.

Once determined, the new paths between each source and destination are pushed to the network controller/PCE that controls segment routing for fast centralized network management. The SR protocol allows routing-related information to be added to IP packet headers, giving each flow a particular path to the destination using encapsulated labels. SR allows dynamic updates to the routing information, allowing to pro-gram forwarding paths whenever Hecate signals an update to the table.

Figure 16:
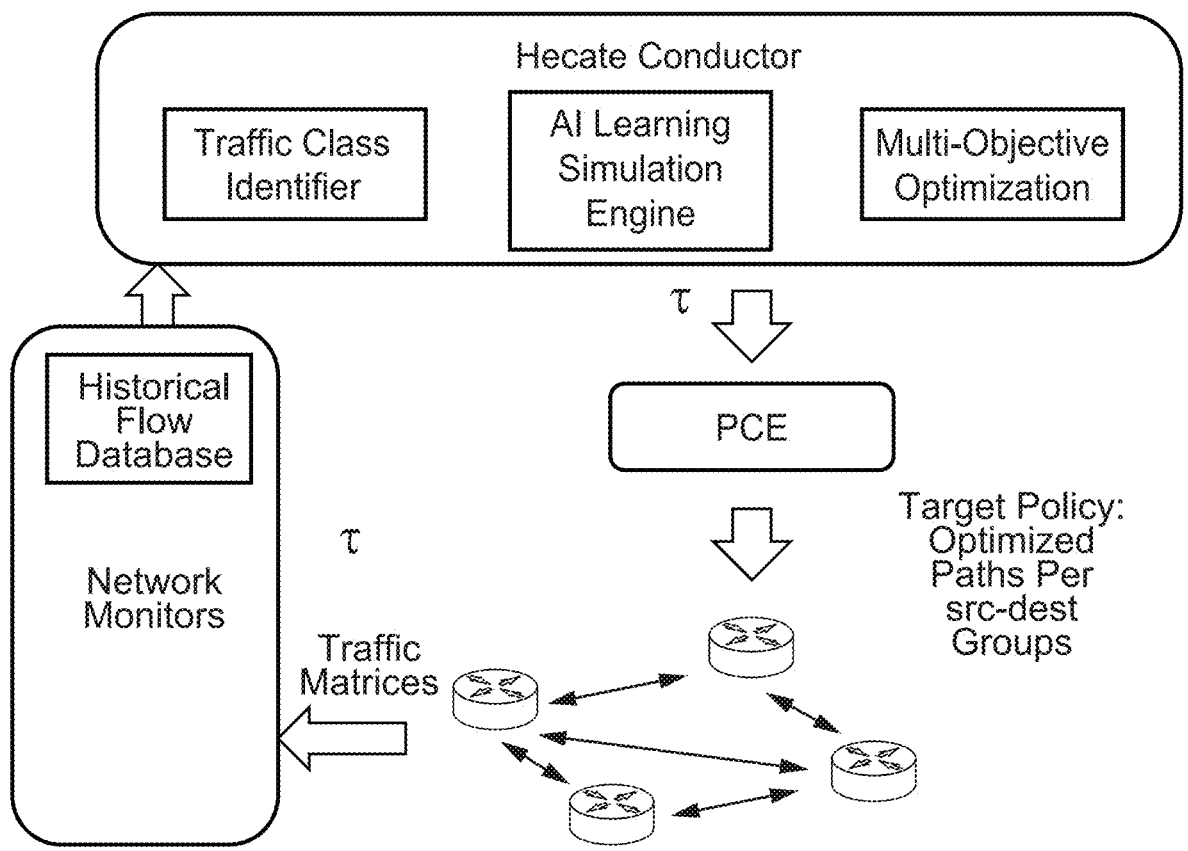
FIG. 16 is another depiction of the Hecate architecture according to an embodiment of the presented technology.

FIG. 16 is another depiction of the Hecate architecture.

B. Graph Neural Network for Prediction

Figure 17:
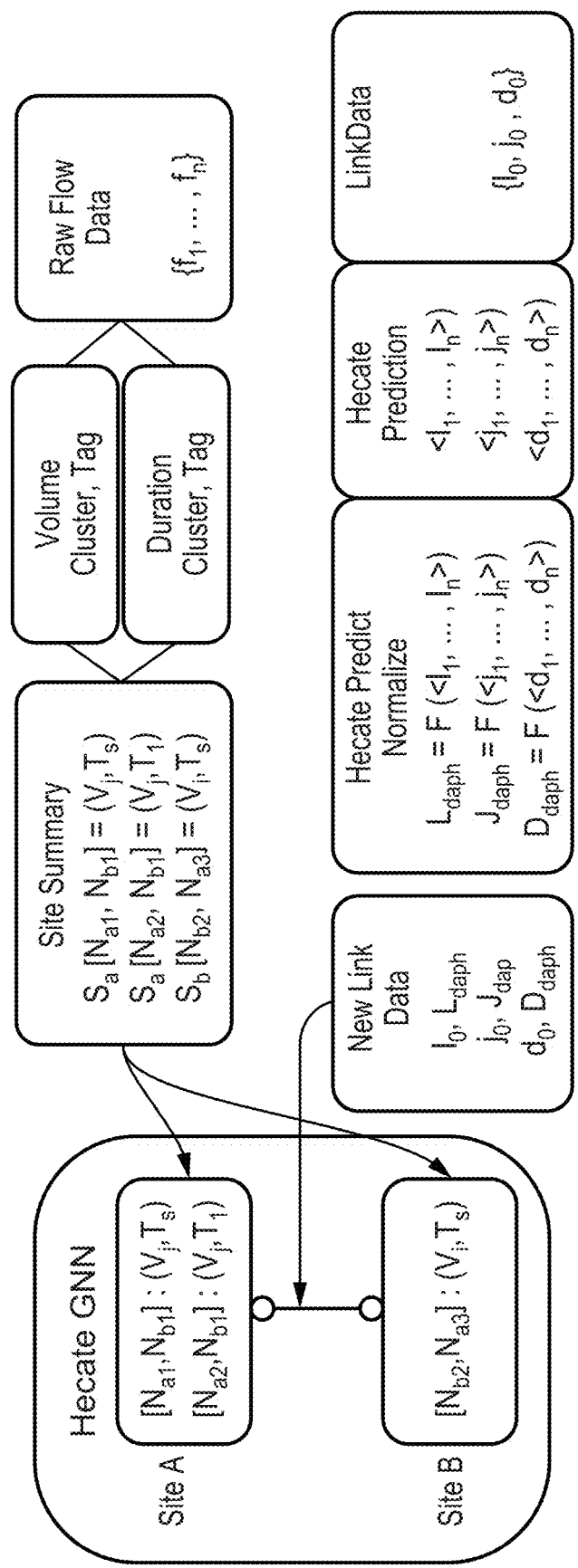
FIG. 17 shows the details for data processing for the Hecate Graph Neural Network (GNN).

Unlike the site data described above, information about links tends to be transient and short lived. Experience in developing GNNs to help predict WAN traffic shows that networks, modeled as graphs, produce better accurate predictions that traditional prediction techniques. FIG. 17 shows how link and flow data are gathered to feed into the Hecate GNN to predict these values.

Extending this work to include spatio-temporal details, the network can be modeled as discrete aggregated network traffic at time t, Gt=(V, E, W). Here V is a set of traffic measurement nodes, giving SNMP, loss, latency and jitter measured at t. E is the set of edges in the network topology and W represents the distance among sites or nodes in the network. In a WAN network, this is represented as 1, as distance does not matter in network traffic speed.

Given the historical observations at each edge of the graph, the goal is to learn a function f(.) that takes observations for t time steps as input to forecast the traffic for the next t' time steps:

$$f(.)X(t-T), \ldots, X(t); GX(t+1), \ldots, X(t+T)$$

Data preprocessing: The model consists of a stack of spatio-temporal convolution blocks and an output layer. Each block consists of two temporal gated layer and a spatial graph layer in between. The output layer consists of convolution, normalized and a fully convolution layer. More details of how this is represented in code are described elsewhere.

Figure 18:
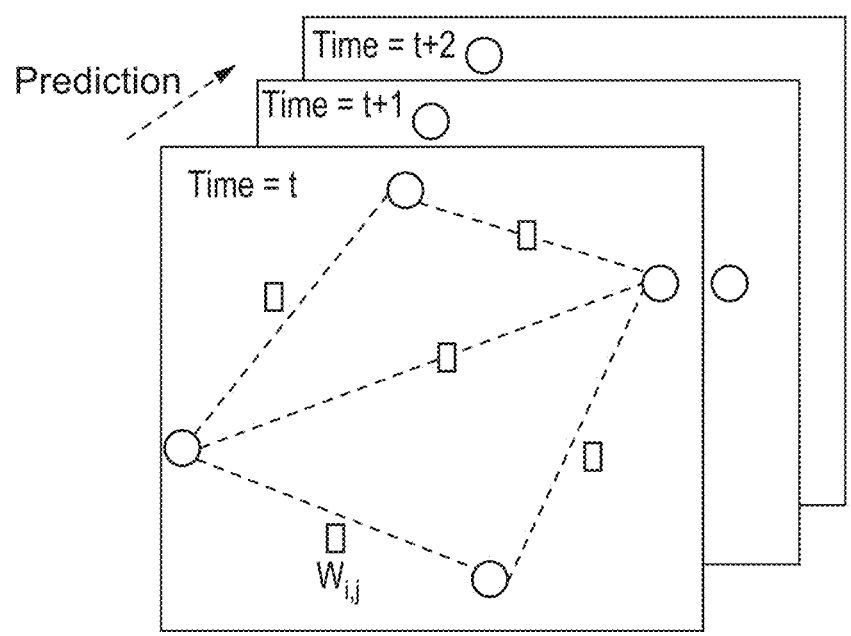
FIG. 18 shows the prediction of time windows where W(i, j)=latency, jitter, loss and traffic details.

FIG. 18 shows Hecate performing a 4-tuple prediction per time window to help build network states in the future.

C. DRL for Graph Optimization

For the DRL algorithm, Hecate uses four types of reward functions as previously described in Table 1.

In each of these cases, Hecate uses the predicted network states, and runs scenarios in its simulation engine, to compute which path is the best at the end of every episode. An episode is defined as a series of 100 runs. Each episode simulates traffic, based on the probabilities learned in the clustering step, with the goal to move flows from all source-destination pairs as quickly as possible. Each link contains different latency, jitter, loss and traffic details, which are informed by the GNN prediction results.

Objective: When a flow duration $r_i$ (in time units) finishes, it computes its completion time ci by adding its duration with path latency. This is then inverted, to give the flow's slowness rate by $l_i = c_i/r_i$. This is then normalized to prevent skewing results for longer flows.

State Space: The state of the network which Hecate learns against is informed by the GNN prediction results. It gives details on latency, jitter, loss and bandwidth across all paths.

Action and Reward Space: At the end of each 100 steps (1 episode), Hecate calculates the reward function the user requested. For actions, it randomly explores all the paths and gets a reward against each. It then uses this to determine the best SRC-DEST pair paths to be pushed to the PCE.

IV. Hecate System Implementation

In this section we explore various implementation details of the theoretical work described in the previous section. This includes details on how the raw data is pre-processed for sites and links.

A. Feature Engineering

FIG. 17 shows Hecate's data pipeline. In it there are two fundamental types of information available for processing: site and link characteristics. Site characteristics describe the behavior of applications and users for a given site. Here site can be considered any endpoint/vertex that provides network services from a given internet protocol (IP) prefix list. This view of services is taken from the analysis of netflow records which describe typical traffic volume and duration between a sites network and other networks of interest.

Link characteristics provide information about the health or behavior of the network between sites. Link information is short lived information about packet latency, jitter, and loss. To create a more intuitive interface, this information is stored in a graph database which can differentiate between links, sites, routers, and PerfSonar instances. The model is (for the time being) purposefully naive in representation, and is subject to change as more characteristics are added (such as queuing, LAG implementation, VLAN tagging etc.) This raw data is taken from the PerfSonar infrastructure built into the core network, but could also be from SNMP information from the routers.

Details about each of the types and the enrichment process for them will be found in the next sections.

B. Learning Traffic Classes for Sites

Figure 19:
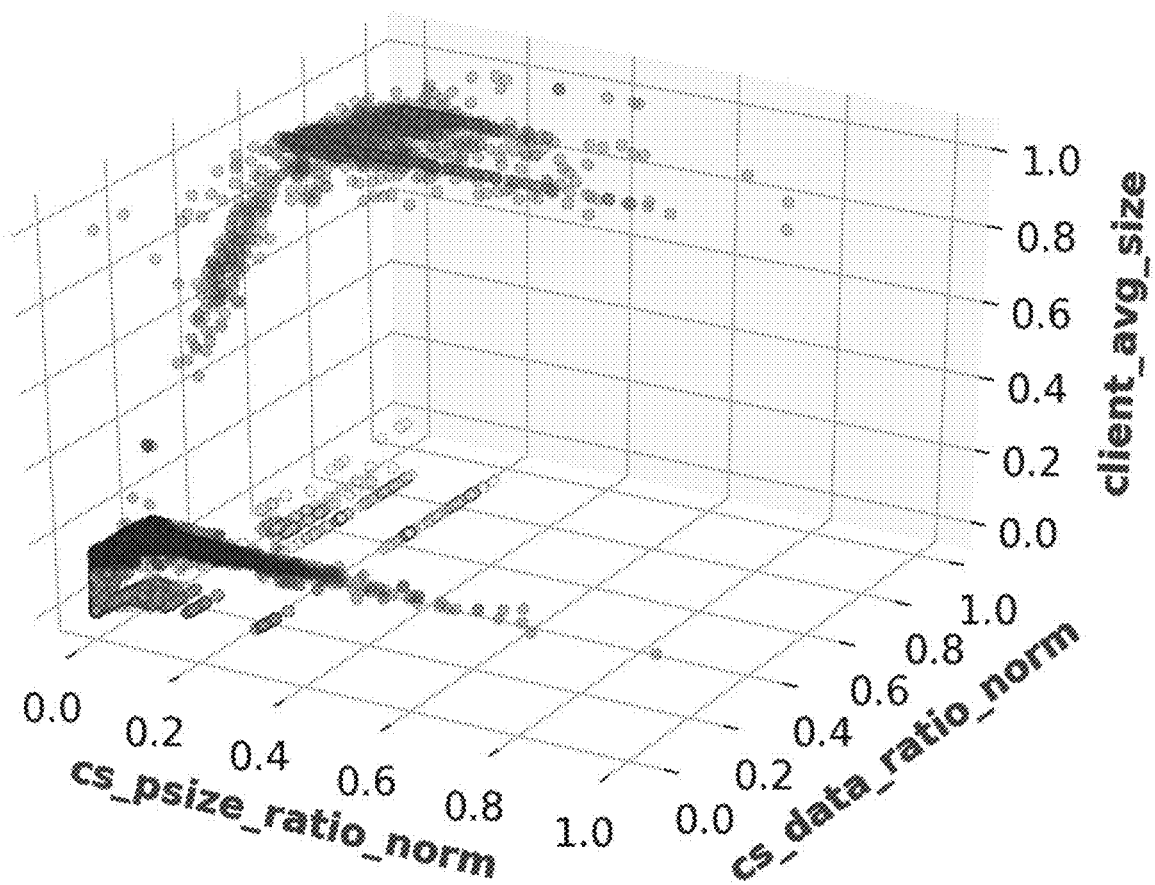
FIG. 19 is an example image of data volume clustering on calculated dimensional values using the axes: cs_psize_ratio_norm (normalized ratio of average packet size for client/server); cs_data_ratio_norm (normalized ratio of data volumes for client/server); and client_avg_size (average data volume for client side of connection).

Since site data describes the behavior of applications and users it tends to change slowly, providing a benchmark of historical behavior as compared to the health data that is, by its nature, rapidly changing. Site behavior is described by flow records between it and other sites and sources/destinations. For a connection, analysis focuses on data volumes, and duration. Since knowing the connection initiator is difficult when using sampled records, the server side for all connections is defined to be the lowest port number (shown in FIG. 19).

The process for generating connection logs from sampled flow records is as follows. First, all traffic to/from a given site is taken by filtering on that sites ASN in the flow record database. Flow records describe one side of a connection, so to match up both sides we look at the client and server IPs and port numbers across well-defined time windows. This creates a connection record with information about data volume, duration etc. A number of additional metrics are pre-calculated as well, an example of this is connection velocity, which is the total observed data volume divided by the connection duration. These connection records are stored in a simple database.

Once the flow records have been enriched, the connection records are taken and then unsupervised clustering is applied to identify what group (if any) to which it belongs. The data volume groups are jumbo, medium, and small/mice, while the duration groups are long, medium, and short as shown in Table 2. Since the vast majority of connections sit in the uninteresting middle—around 1-2% of the total number typically are labeled jumbo or interactive—the actual number of actionable connections is fairly low. The general heuristic for analysis is shown in Algorithm 1.

| Algorithm 1 Unsupervised Clustering |
| --- |
| 1:     C is Connection set |
| 2:     clusterCount ⇐ SilhouetteValue(C) |
| 3:     dataClusters = KMeans(C, clusterCount) |
| 4:     for τ = type$_1$, type$_2$, . . . , type$_n$ do |
| 5:         Identify cluster group T$_i$ within dataClusters |
| 6:         All conns in group are tagged with type T$_i$ |
| 7:     end for |

The output from Algorithm 1 is tagged clusters which are then inserted into second database which provides site information based on SRC-DST network references. The database itself provides composite information about site behavior including historical time and dates as well as record counts and the space for more than one group type to be recorded. This allows maximum fidelity to be presented to the optimizer GNN.

Algorithm 2 shows how this data is then leveraged by the GNN and DRL to perform Hecate's function.

C. Training the DRL Agent

The Hecate DRL agent runs in an episodic fashion (with 100 flows in simulation). The episode terminates when all flows have been allocated.

| Algorithm 2 Hecate Algorithm |
| --- |
| 1:     procedure Hecate Predict DRL |
| 2:         Input : τ ← Topology, σ ← ProcessedFlowdata |
| 3:         Input : Linkdata(loss, latency, jitter, bandwidth) |

| Algorithm 2 Hecate Algorithm | |
|---|---|
| 4: | optimization type ← OptimizationSelection |
| 5: | |
| 6: | $loss_{1,...,n}$ ← GNNPredict(loss) |
| 7: | $latency_{1,...,n}$ ← GNNPredict(latency) |
| 8: | $jitter_{1,...,n}$ ← GNNPredict(jitter) |
| 9: | $bandwidth_{1,...,n}$ ← GNNPredict(bandwidth) |
| 10: | |
| 11: | $NetModel_0$ ← NetSimulation($\tau$, $\sigma$) |
| 12: | |
| 13: | Train AI to learn optimal paths based off arriving flows |
| 14: | with $loss_{1,...,n}$, $latency_{1,...,n}$, and $jitter_{1,...,n}$ as inputs to $NetModel_0$ |
| 15: | end procedure |

A Q-value is added with each state and action taken and saved into a Q-table. As the reinforcement learning algorithm uses Bellman's equation, there is a possibility of overfitting to ideal conditions. To prevent this, during the testing phase, E is used for allowing DRL to select random action rather than Q-table values (Algorithm 3).

| Algorithm 3 Q-learninq for Training DRL | |
|---|---|
| 1: | Initialize Q-table |
| 2: | for each Iteration: do |
| 3: |   for each Episode: do |
| 4: |     Generate 100 flows |
| 5: |     for each flow i=1,..., 100: do |
| 6: |       Get bandwidth: |
| 7: |       Get network health per path |
| 8: |       if randomnumber < ∈ then |
| 9: |         Select any action $a_i \in (A)$ |
| 10: |       else |
| 11: |         if $(s_i, a_i) \in$ Q-table then |
| 12: |           Select action with highest Q-value |
| 13: |           update Q-value |
| 14: |           Check expired flows and add reward |
| 15: |         else |
| 16: |           add $(s_i, a_i)$ to Q-table |
| 17: |         end if |
| 18: |       end if |
| 19: | |
| 20: |     end for |
| 21: |   end for |
| 22: | end for |
| 23: | |
| 24: | for each Episode: do |
| 25: |   Print Reward |
| 26: | end for |

D. Getting Optimizations to the SR Controller

Once data has been identified and enriched, it can then be delivered to a segment routing (SR) controller, which is in turn used to implement policy on the existing traffic flows. Because the SR controller, or Path Computational Engine (PCE) has a full topological view of the network environment in near-real-time, this system can pre-compute primary and backup paths for any given traffic engineered (SR-TE) path. Once known, any known set of end points may be placed into an SR-TE path and provisioned across a given network using the underlying capabilities of the PCE, notably SR-TE. This action is executed by leveraging an exposed application programming interface (API) within the PCE, and can be removed once deemed necessary by the same mechanisms.

V. Evaluation

Hecate is evaluated to specifically help answer the following questions:

1) What is the performance gap between Hecate and standard shortest possible route solutions for TE problems?

2) How does utilization Hecate perform with topology changes such as link failures?

a. Comparison with Shortest Possible Route

Figure 20:
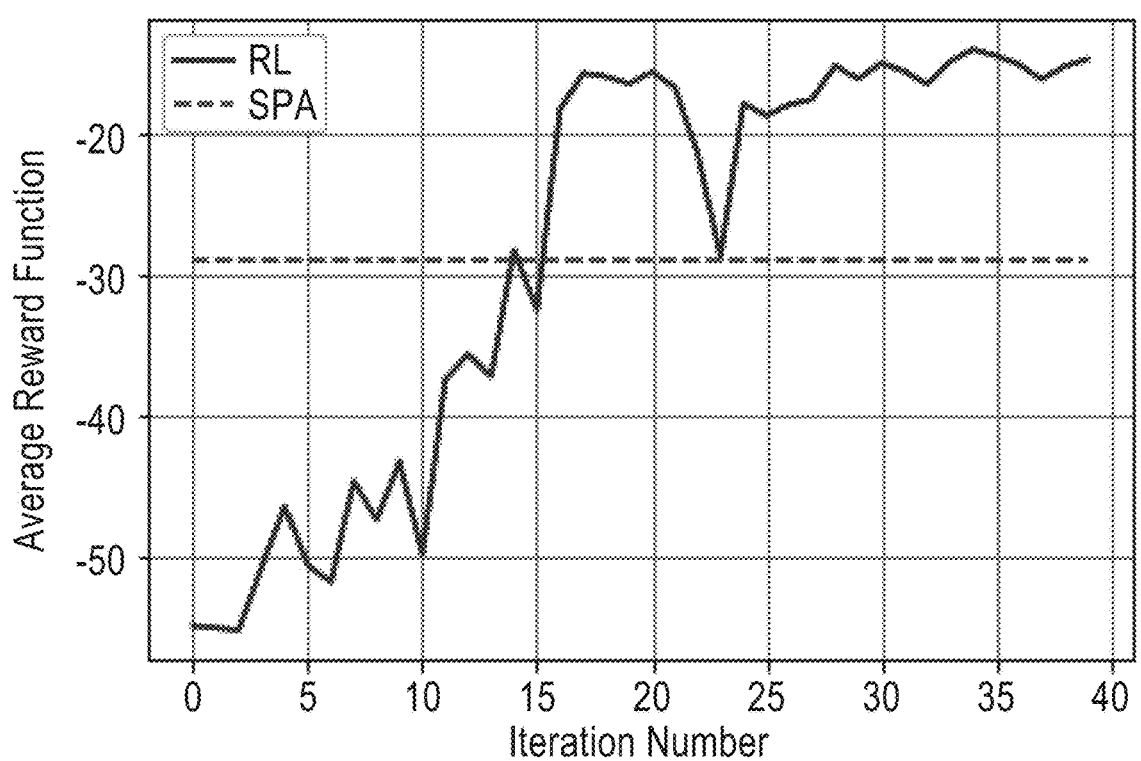
FIG. 20 is a graph of a comparison between the reward function of RL and the shortest possible route.

The comparison of reward obtained through the RL agent and shortest possible route in FIG. 20 shows that the RL agent is able to learn better optimal strategies, since it has more data to make decisions. In a real network setting, these conditions change more drastically, and Hecate would need to adapt to the changing conditions even if the predictions go far.

B. Network Utilization Maximized

Figure 21A:
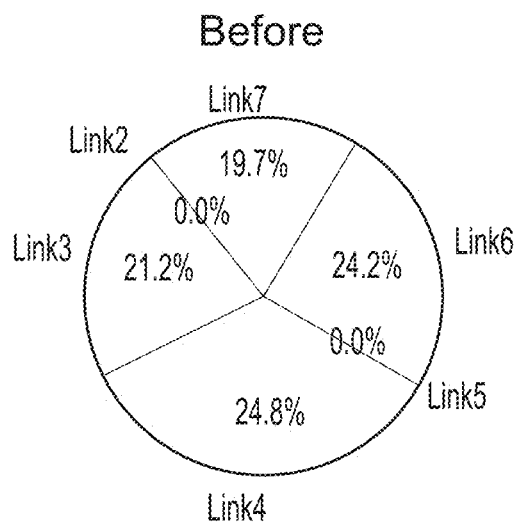
FIG. 21A shows a network utilization prior to Hecate use.
Figure 21B:
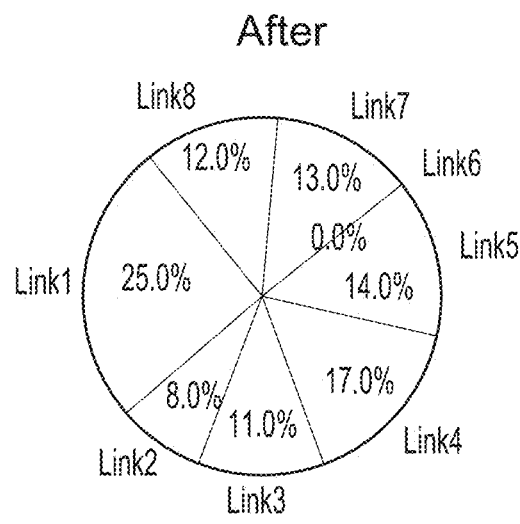
FIG. 21B shows the network utilization of the identical network of FIG. 21A after Hecate use according to an embodiment of the presented technology.

FIG. 21A shows the before and FIG. 21B shows the utilization after using Hecate. Here it appears that while link 1 was underused in FIG. 21A before Hecate use. Afterwards, in FIG. 21B, Hecate has learned to use link 1 more.

C. Robustness

When using any sort of automated control or advisory systems it is necessary to create a framework around what is being requesting in order to reduce the chance of unexpected behavior. For the Hecate application this is represented in a number of ways.

The first, and most basic test is to look at the magnitude of suggested changes. If it is zero for one or two cycles, it is entirely possible that no changes are required for optimal path selection. This would most likely occur when a network is over provisioned relative to the load that is being placed on it. The opposite of this would be if an unusually large number of changes were made to the routing table. It is expected that the number of changes per time period will occur within a fairly well-defined curve. If this number is too far out of normal behavior, re-examination of the running system should be done.

VI. Related Work

Open-source toolkits such as Ryu, ONOS and ODL, with OpenFlow controllers can control network resources through south-bound APIs to network devices. These south-bound interfaces (SBI) transfer instructions from north-bound applications (NBI) and SDN controllers, using 'how-to' commands to provision underlying network. High-level queries such as 'allow traffic between A and B', is translated into prescriptive commands 'from A:10.0.0.1 to B:10.0.0.2 set rule=allow' and rendered as OpenFlow rules. Source Routing (SR) is an alternative to table-based routing, but is based on Port Switching to maintain a state in the packet by using a header rewrite operation.

Comparison with current solutions: In the same way that Hecate is not seen as a wholesale replacement for traffic engineering, a possible home for it is seen in a larger framework such as the Application-Layer Traffic Optimization (ALTO) protocol. This protocol provides information about networks for applications to use in performance and resource utilization in the form of an interface between an ALTO client and an ALTO server. The ALTO server provides cost maps that allow ALTO clients (applications) to determine preferences among locations in a network, which is represented by a network map. While Alto is designed for multi-domain networking, Hecate follows RFC 7575 and 7576 principles. SENSE is designed for intent and large flow transfers over multi-domain networks.

Autonomic networking: Hecate is designed for within a network domain, based on autonomic principles to improve traffic engineering intent which leads to decentralized and distributed decision making. The original design goals of autonomic systems as described elsewhere show a goal of self-management, which is comprised of several 'self' properties:

1) Self-configuration (Functions do not require configuration, by either an administrator or a management system. They configure themselves, based on self-knowledge, discovery, and Intent. Discovery is the default way for an autonomic function to receive the information it needs to operate);

2) Self-healing (Autonomic functions adapt on their own to changes in the environment and heal problems automatically;

3) Self-optimizing (Autonomic functions automatically determine ways to optimize their behavior against a set of well-defined goals); and 4) Self-protection (Autonomic functions automatically secure themselves against potential attacks).

Optimizing using Segment Routing: In modern networks it is required to possess and leverage the ability to actively steer traffic flows across predetermined paths in order to efficiently utilize resources such as available bandwidth or to further control a specific path for a particular classification of traffic. Historically, this process has been performed by standard IP routing protocols (limited control), or MPLS based tools such as RSVP-TE (more control). In some cases, there may be semi-automated cost recalculations that leverage standard protocols, changing link costs or equal cost multipath (ECMP) configurations. These methodologies are able to scale but typically lack autonomy, contain scale limitations, or incur large operational expenditure and engineer time. Rather than being a wholesale replacement for a well understood and trusted mechanism like MPLS-TE or Segment Routing, Hecate provides additional information about path optimization based on current network conditions as well as historical behaviors amongst the set of endpoints, thus retaining the ability to more easily integrate into existing network systems.

V. Conclusions

Breakthroughs in deep learning research, can definitely help make strides in network routing research. In Hecate, both prediction and reinforcement learning are leveraged to optimize the network by using just the data and learning the patterns from the data.

In network systems designed for production use, there is the added complexity of how optimizations will be translated back into the operational network. Currently, Hecate is designed as a centralized approach and would encounter scaling issues in very large networks. Alternative methods such as multi-agent learning approaches need to be leveraged to extend the scalability in large networks. This disclosure highlights the need to use AI for improve network management and striking a balance between what the user needs and what the network can provide. Further work will explore optimization comparisons with graph optimizations and better predictions models.

Figure 22:
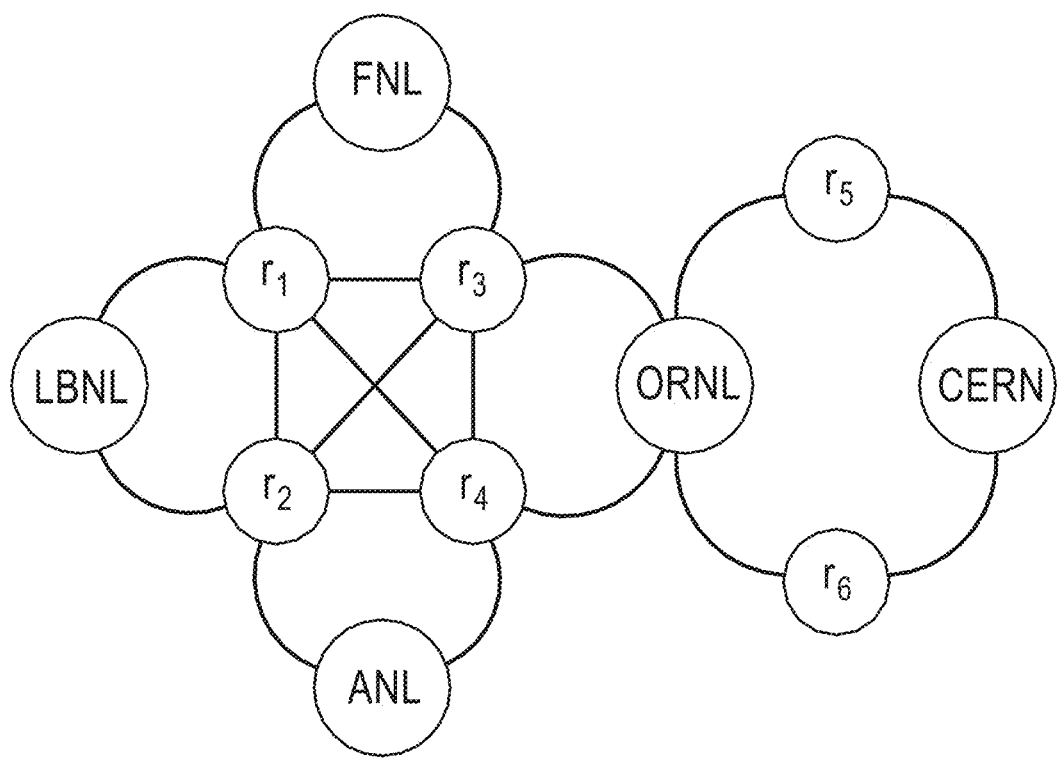
FIG. 22 is a depiction of the test network topology used in this ESnet Example.

Finally, FIG. 22 is a depiction of the test network used in this Example. Typical flow characteristics between the various sites are found in Table 3.

EXAMPLE 3

Segment routing, a form of computer networking that is a modern variant of source routing, is being developed within the SPRING and IPv6 working groups of the IETF. In a segment-routed network, an ingress node may prepend a header to packets that contain a list of segments, which are instructions that are executed on subsequent nodes in the network. These instructions may be forwarding instructions, such as an instruction to forward a packet to a specific destination or interface.

Route calculation for traffic allows it to be routed through a large network based on label stack such as in segment routing cases. The path is calculated and pushed by network engineers prior to deployment and only updated a few times if something is wrong. Described herein is a method of using machine learning to learn traffic patterns and perform a path generation by real-time network telemetry that automatically calculates an optimum path for the label stack moving the flow through the network with minimum packet loss and optimal delivery time.

In some embodiments of a new method, the routing is informed via real-time health telemetry data (latency, utilization, loss) to calculate an optimal path using a segment routing label stack. In some embodiments, a path computation engine maintains a health table that is used to recalculate paths periodically.

Hecate: Enabling Your Network to Become Self-Driving

Introduction

The next generation of DOE data intensive experiments, inter-facility cooperation, and high-performance computing create demands on network management that are far more complex than those faced today. Balancing data volume and latency needs while keeping staff and cloud access as performant as possible are some examples of these demands. Software Defined Networking (SDN) allows for programmable networks which is beneficial for controlling some systems, but there are scaling issues for WAN scale solutions as well as slow progress in developing multi-objective path optimizations in software-network systems. In this demonstration, Hecate is presented as a stand-alone device that can be plugged into any network infrastructure which provides three main services: 1) investigate current application needs and traffic patterns; 2) run bespoke data-driven deep reinforcement learning that learn optimal controls to improve traffic engineering; and 3) renders Hecate decisions to SDN and PCE (path computation engine) technologies to bring AI to real networks.

I. Overview

Service providers for wide area networks (WANs) need to provide high performance data movement, low latency communication and effective commodity/cloud access in order to maximize the usability of what resources they already have since there are few organizations that are not limited in terms of money, space, or engineering resources. Traffic engineering and path computation techniques such as MPLS-TE (Multiprotocol Label Switching Traffic Engineering), Google's B4 and Microsoft's SWAN (Software Driven WAN) propose manners in which routers can greedily select routing patterns for arriving flows, both locally and globally, to increase path utilization. However, these techniques require meticulously designed heuristics to calculate optimal routes and also do not distinguish between arriving flow characteristics. Hecate, is a revolutionary solution that exploits data-driven learning to improve traffic engineering decision making. Deep reinforcement learning (RL) programs have been used to teach systems how to drive a car, control massive power grids or self-playing games. With an optimal neural network architecture, a robust deep RL solution can replace controllers in complex environments for model free optimum control of various complex systems. Both simulation and real setup to control the deep RL for networks has been developed.

The project provides an API for importing traffic profiles and network health data for use in developing bespoke data-driven learning, the simulation of traffic profiles and to demonstrate alternate routing decisions for current traffic profile optimization. Hecate packages a number of tools, prediction, simulation, learning and verification systems for ensuring that the correct decisions are being recommended. Once checked, the engine proceeds to automatically setup topologies via segment routing, PCE, and extendable to deploy network circuits (using common techniques such as NSI and OSCARS).

To demonstrate this, various aspects are presented:
1) Multiple traffic classes or profiles using CLI in easy high-level language to communicate what can be optimized.
2) Traffic graphs to easily identify network conflicts and for future optimization research.
3) Multiple network topologies to demonstrate optimization options for users specific traffic engineering scenarios.
4) Render decisions for a fully self-driving network solution.

Figure 23:
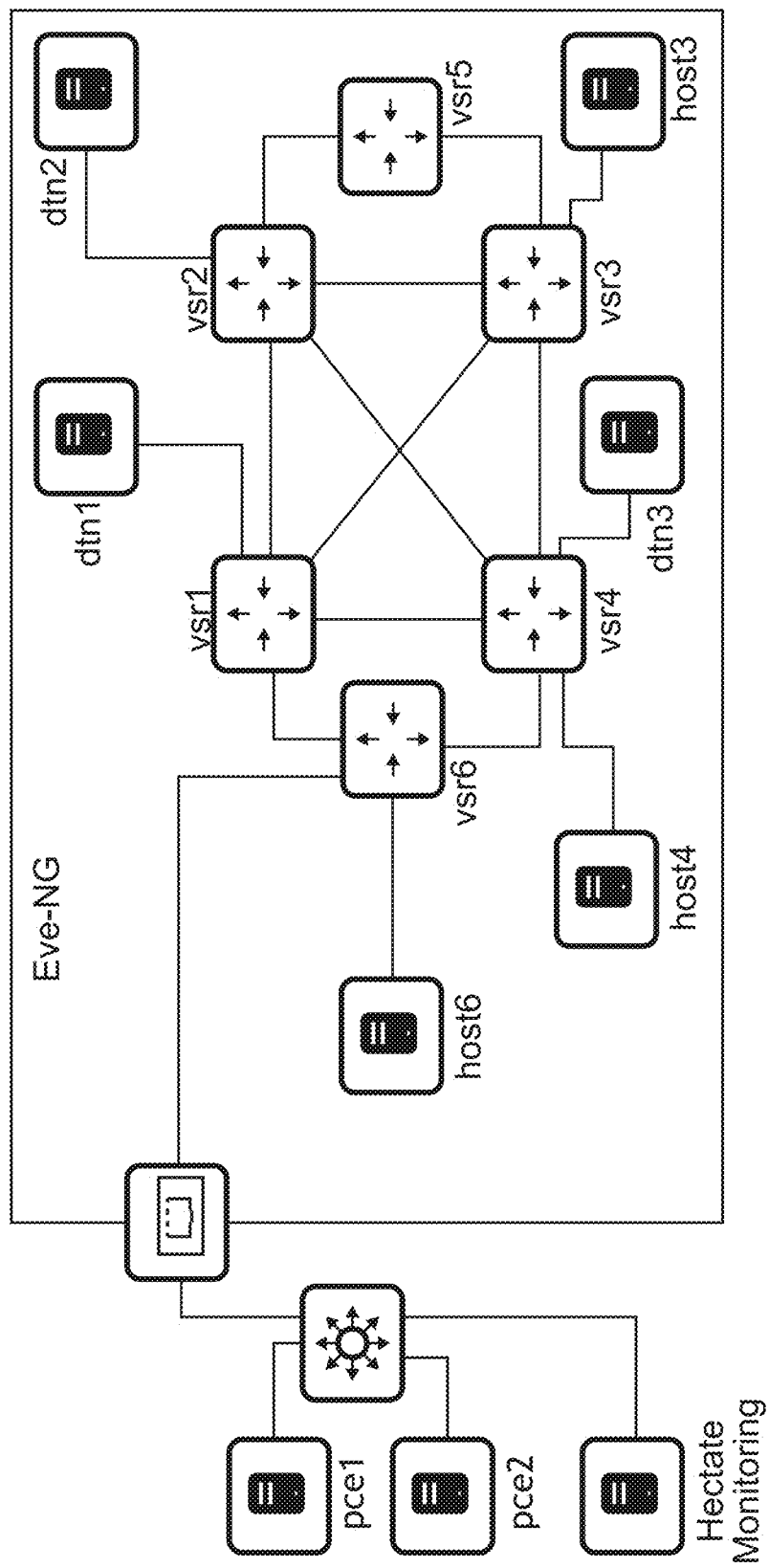
FIG. 23 is a topological graph of a network being used during a Network Research Exhibition (NRE) demonstration being discussed herein.

The topology being used here during the NRE demonstration is shown in FIG. 23.

II. Innovation

The application of advances in deep learning research, made possible by new algorithms, accelerated hardware, and big data, have benefited many fields. However, there are few solid examples of how this can be used in network routing research. By utilizing deep reinforcement learning, the Hecate controller is allowed to learn from both short term and historical network behaviors in the environment about the paths and best hops between source and destination. Given the dynamic nature of network environments and knowing that naive implementations can cause packet loss and traffic congestion across some of the best paths, it is shown how the Hecate controller can provide alternate configurations depending on the traffic arriving and the current network conditions to optimally utilize the network.

Currently nothing like this exists in the commercial world that can learn bespoke solutions and be plugged into any modern network.

III. HPC and Science Relevance

LHC and other related experiments have data transfer requirements that require data streaming as well as the transfer of files across multiple network nodes at different times of the day. This project aims to cater to those critical needs at the same time as making sure that the smaller (but perhaps more time sensitive) needs of staff and other experimenters are not ignored. First, the project will learn traffic patterns from workflows of physicists, biologists and non-networking experts to easily define their network service needs. End-users can define conditions on what bandwidth they expect, what time they want file transfer to start or by when data should be delivered, with carrying conditions. Second, the Hecate engine will interpret this using a parser and identify network traffic patterns that can be rendered onto the physical network—at this point historical behaviors are taken into consideration both in terms of weighting path options as well as making sure that the various (possibly contradictory) needs are met. Any possible conflicts with network policies, limitations will be identified and communicated back to users. Third, the project will automatically deploy network circuits across multiple network domains to enable user-specific service using segment routing and PCE technologies. The project aims to strengthen the relationship between machine learning and network research domains, leading to the first ever demo of how this will work in real-life.

Introducing the New Network Conductor: Hecate Conductor Versus Normal Traditional Network Orchestrator Network orchestrator refers to the process of automating interactions with multiple devices, domains and other networks. It is the next stage of network automation that uses policy driven workflow management.

Whereas network automation typically focuses on a single device or series of similar devices, in order to push configuration changes. Orchestration is more aware of the entire ecosystem, encompassing multiple elements, executing a complete workflow across potentially disparate systems. Examples of orchestration include application aware SDN, provisioning of a complete end-to-end service including the network stack (layer 1-layer3, a compute element such as a VM, an application to support the service such as a web server, security controls such as host-based firewall and network access control lists as well as the DNS).

Hecate has multiple capabilities: 1) it can run prechecks; 2) it can roll back the network to earlier states; and 3) it can react to an event or error message receipt.

Orchestration is generally defined as the automated arrangement, coordination, and management of computer systems, middleware, and services.

Hecate Network Conductor

Traditionally, network orchestration refers to the process of automating interactions with multiple devices, domains and other networks. It is the next stage of network automation that uses policy driven workflow management. Network automation typically focuses on a single device or series of similar devices, in order to push configuration changes. Orchestration, however, is more aware of the entire ecosystem, encompassing multiple elements, executing a complete workflow across potentially disparate systems. Examples of orchestration include application aware SDN, provisioning of a complete end-to-end service including the network stack (layer 1-layer 3, a compute element such as a VM, an application to support the service such as a web server, security controls such as host-based firewall and network access control lists as well as the DNS).

Here, the Network Conductor acts as the 'brain' center of the network. A conductor can perform 4 functions: 1) Monitor the network; 2) Analyze the network data sets; 3) Perform planning on what to do given the network state; and 4) Execute planned action by connecting to network orchestrator.

A traditional network orchestrator can: run prechecks, rollback network to an earlier state, and can react to an event or error message received.

Here, the Network Conductor can contain a collection of machine learning models that help it to analyze and plan actions to improve the network.

A traditional network orchestrator refers to orchestration as the automated arrangement, coordination, and management of computer systems, middleware, and services. In this view, workflow management for user-based interactions is used within an operations support system. This results in an automated service provisioning across network, compute, and application resources.

Here, the conductor (in terms of the function that it performs) takes state information about the network, business logic, and calculated/predictive results and gives instructions to the orchestration framework to make changes to the state of the network.

Based on this definition, the path computation engine (PCE) would be part of the conductor while the NSO would be orchestration.

A Traditional Network Orchestrator the Definition of a Conductor Used Herein

Network orchestrator refers to the process of automating interactions with multiple devices, domains and other networks. It is the next stage of network automation that uses policy driven workflow management.

Whereas network automation typically focuses on a single device or series of similar devices, in order to push configuration changes. Orchestration is more aware of the entire ecosystem, encompassing multiple elements, executing a complete workflow across potentially disparate systems. Examples of orchestration include application aware SDN, provisioning of a complete end-to-end service including the network stack (layer 1-layer 3, a compute element such as a VM, an application to support the service such as a web server, security controls such as host-based firewall and network access control lists as well as the DNS).

Network Conductor acts as the 'brain' center of the network. A conductor can perform seven typical functions: 1) Monitor the network; 2) Analyze the network data sets; 3) Perform planning on what to do given the network state; 4) Execute planned action by connecting to network orchestrator; 5) Can run prechecks; 6) Can rollback network; and 7) Can react to an event or error message received.

The conductor can contain a collection of machine learning models that help it to analyze and plan actions to improve the network.

Orchestration is the automated arrangement, coordination, and management of computer systems, middleware, and services.

Workflow management for user-based interactions within our operations support system;

Automated service provisioning across network, compute, and application resources.

The conductor (in terms of the function that it performs) takes state information about the network, business logic, and calculated/predictive results and gives instructions to the orchestration framework to make changes to the state of the network.

Based on this definition, the path computation engine (PCE) would be part of the conductor while the NSO would provide orchestration.

A summary of the differences between current network solutions and the Hecate approach are discussed in Table 4.

In some embodiments, a data path extraction tool uses machine-learning models to selectively classify clusters of cells in an integrated circuit design as either data path logic or non-data path logic based on cluster features. In some embodiments, a support vector machine and a neural network are used to build compact and run-time efficient models. In some embodiments, a cluster is classified as a data path if both the support vector machine and the neural network indicate that it is data path-like.

Described herein are techniques for stateful connection optimization over stretched networks. Such stretched networks may extend across both a data center and a cloud. In some embodiments, configuration changes are made to cloud layer 2 (L2) concentrators used by extended networks and a cloud router such that the L2 concentrators block packets with the cloud router's source MAC address and block address resolution protocol (ARP) requests for a gateway IP address from/to cloud networks that are part of the extended networks. In some embodiments, the cloud router is configured with the same gateway IP address as that of a default gateway router in the data center and responds to ARP requests for the gateway IP address with its own MAC address. In some embodiments, specific prefix routes (e.g., /32 routes) for virtual computing instances on route optimized networks in the cloud are injected into the cloud router and propagated to a data center router.

EXAMPLE 4

Figure 24:
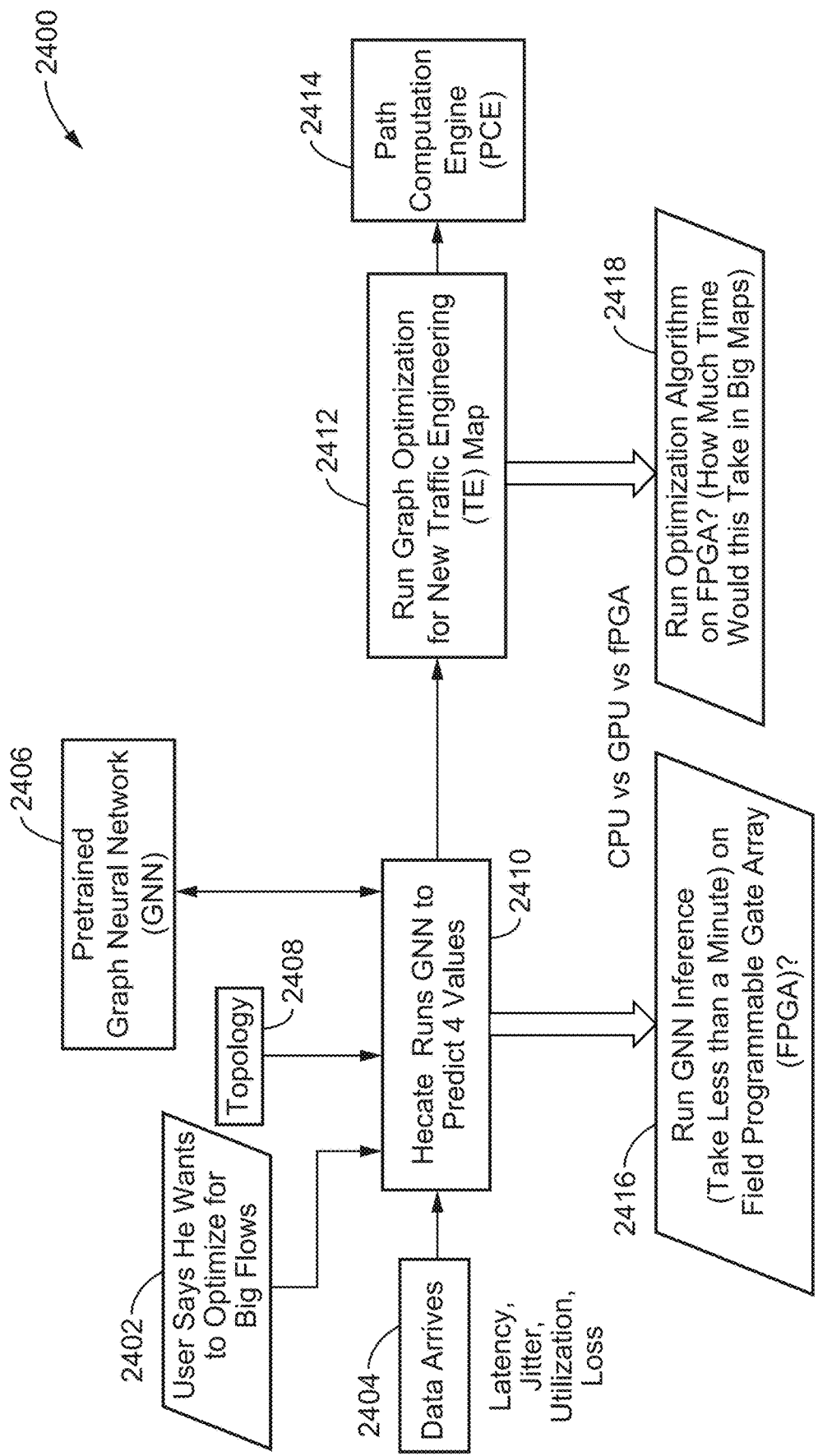
FIG. 24 is an overview of the overall Hecate self-driving autonomous network routing implementation according to an embodiment of the presented technology.

Refer now to FIG. 24, which is an overview 2400 of the Hecate implementation.

Initially, a user selects 2402 what is the optimization goal—in this case for large flows.

New network health data arrives 2404, including latency, jitter, utilization, and loss. The new network health data is then fed to a pretrained hardware accelerated Graph Neural Network (GNN) 2406, which generates predicted values for (latency, jitter, utilization, loss, etc.).

This pre-trained GNN 2406 can be periodically re-trained in an asynchronous manner based on traffic characteristics changes as well as network health data, etc.

Predicted values for latency, jitter, utilization, loss, etc., along with other data, such as topology 2408 and characteristic end point behavior are calculated 2410 in the Hecate main, are fed to the Graph Optimizer 2412, which takes into consideration the user selected optimization goals 2402.

The resulting optimized path information is passed to the network controller (in this example a Path Computation Engine (PCE) 2414.

It should be noted that running the GNN inference 2416 may take less than a minute on a field programmable gate array (FPGA). Similarly, running of the Graph Optimizer 2412 on an FPGA 2418 should be dramatically reduced when compared to a software implementation.

EXAMPLE 5

Appendix A referenced herein is a computer program listing in a text file entitled "UCLBL-2021-010-02-US-computer_program_appendix_A.txt" created on Nov. 2, 2022 and having a 344 kb file size. This computer program appendix describes programming code written in Python for the implementation of the various embodiments and Examples described herein.

From the description is this disclosure, it will be appreciated that the present disclosure encompasses multiple implementations of the technology which include, but are not limited to, the following:

An apparatus for autonomous network traffic management of any preceding or following implementation, comprising: (a) a non-transitory medium storing instructions executable by one or more processors; (b) wherein said instructions, when executed by at least one of the processors, perform steps comprising: (i) acquiring network traffic profiles and network health data from a network; (ii) predicting future network statistics based on the network traffic profiles and network health data; (iii) providing network optimization objectives; and (iv) optimizing network path routing over the network optimization objectives utilizing deep reinforcement learning using the predicted future network statistics; (v) implementing the optimized network path routing over the network for particular network traffic profiles.

The non-transitory medium of any preceding or following implementation, wherein said acquiring network traffic profiles and network health data instructions when executed by the processor further performs steps comprising: (a) inputting a sampling time frame; (b) collecting network information over the sampling time frame; (c) outputting the network information into an historical database; (d) wherein the historical database comprises: (i) source in the network; (ii) a destination in the network; (iii) a transfer size; (iv) a transfer duration; and (v) network health data; (e) redirecting an optimal solution for source-destination pathways for a certain traffic class.

The non-transitory medium of any preceding or following implementation, wherein said traffic classes are selected from a group of traffic classes comprising: (a) long-living flows that contain multi-TB to multi-PB data transfers lasting 1-200 hours; (b) short-lived flows that contain short amounts of "bursty" data transfers lasting less than 60 seconds; (c) low-latency traffic flows that require low latency and minimum packet loss; (d) priority flows that can be prioritized over other flows in the network; (e) high throughput flows that require bandwidth greater than 100 GB/s; (f) intent-based flows that have particular conditions associated with them such as deadlines, forbidden paths and required network characteristics; and (g) default flows with no requirements attached.

The non-transitory medium of any preceding or following implementation, wherein said network health data is selected from one or more of a group of data comprising: (a) latency; (b) loss; (c) bandwidth; and (d) jitter.

The non-transitory medium of any preceding or following implementation, wherein said optimizing network path routing when executed by the processor further performs steps comprising: (a) training a simulator Graph Neural Network (GNN) to provide an optimal solution for source-destination pathways; and (b) simulating the traffic classes on the GNN to output the optimal solution for source-destination pathways.

The non-transitory medium of any preceding or following implementation, wherein said implementing the optimized network path routing over the network for particular network traffic profiles when executed by the processor further performs steps comprising: (a) communicating routing actions directly to network elements; and (b) utilizing the routing actions to transfer a future data transfer from a designated source to a designated destination according to the optimal source-destination pathway for the traffic class of the future data transfer.

The non-transitory medium of any preceding or following implementation, wherein said simulator Graph Neural Network (GNN) is hardware accelerated.

The non-transitory medium of any preceding or following implementation, wherein said hardware acceleration is accomplished by utilization of a Raspberry Pi or a field programmable gate array (FPGA).

An apparatus for autonomous network traffic management, comprising: (a) one or more network traffic monitors; (b) one or more processors configured to receive input from one or more of the network traffic monitors; and (c) a non-transitory memory storing instructions executable by the processor; (d) wherein said instructions, when executed by the processor, perform steps comprising: (i) detecting network health on at least one of the network traffic monitors; (ii) identifying network traffic over a period of time into traffic classes; (iii) identifying network health over the period of time into network health data; (iv) storing network traffic information into an historical database; (v) providing the traffic classes information, network health data and network traffic information to at least one AI/ML (Artificial Intelligence/Machine Learning) library, wherein the AI/ML library comprises a graph neural network (GNN) component; (vi) predicting future network health from the AI/ML library graph neural network (GNN) component to create a Predicted and Optimal network solution; and (vii) outputting the Predicted and Optimal network solution to a Route Behavior Engine (RBE).

The non-transitory medium of any preceding or following implementation, wherein said identifying network traffic and network health data instructions when executed by the processor further performs steps comprising: (a) inputting a sampling time frame; (b) collecting network information over the sampling time frame; (c) outputting the network information into an historical database; (d) wherein the historical database comprises: (i) a source in the network; (ii) a destination in the network; (iii) a transfer size; (iv) a transfer duration; and (v) network health data; (e) predicting an optimal solution for source-destination pathways for a certain traffic class.

The non-transitory medium of any preceding or following implementation, wherein said traffic classes are selected from a group of traffic classes comprising: (a) long-living flows that contain multi-TB to multi-PB data transfers lasting 1-200 hours; (b) short-lived flows that contain short amounts of "bursty" data transfers lasting less than 60 seconds; (c) low-latency traffic flows that require low latency and minimum packet loss; (d) priority flows that can be prioritized over other flows in the network; (e) high throughput flows that require bandwidth greater than 100 GB/s; (f) intent-based flows that have particular conditions associated with them such as deadlines, forbidden paths and required network characteristics; and (g) default flows with no requirements attached.

The non-transitory medium of any preceding or following implementation, wherein said network health data is selected from one or more of a group of data comprising: (a) latency; (b) loss; (c) bandwidth; and (d) jitter.

The non-transitory medium of any preceding or following implementation, wherein said optimizing network path routing when executed by the processor further performs steps comprising: (a) training the Graph Neural Network (GNN) to provide an optimal solution for source-destination pathways; and (b) simulating the traffic classes on the GNN to output the optimal solution for source-destination pathways.

The non-transitory medium of any preceding or following implementation, wherein said implementing the optimized network path routing over the network for particular network traffic profiles when executed by the processor further performs steps comprising: (a) communicating routing actions directly to the Route Behavior Engine (RBE); and (b) utilizing the routing actions to transfer a future data transfer from a designated source to a designated destination according to the optimal source-destination pathway for the traffic class of the future data transfer.

The non-transitory medium of any preceding or following implementation, wherein said simulator Graph Neural Network (GNN) is hardware accelerated.

The non-transitory medium of any preceding or following implementation, wherein said hardware acceleration is accomplished by utilization of a Raspberry Pi or a field programmable gate array (FPGA).

An apparatus for autonomous network traffic management, comprising: (a) a non-transitory medium storing instructions executable by one or more processors; (b) wherein said instructions, when executed by at least one of the processors, perform steps comprising: (i) providing one or more network optimization goals for a network; (ii) acquiring network traffic profiles and network health data from the network; (iii) predicting future network statistics on a pretrained hardware accelerated Graph Neural Network (GNN) based on the network traffic profiles and network health data; (iv) inputting the future network statistics, network optimization goals, a network topology, and a network characteristic end point behavior into a Graph Optimizer to output optimized path information; and (v) generating an optimized network path routing over the network using a Path Computation Engine (PCE), the optimized path information, and the network topology.

The non-transitory medium of any preceding or following implementation, wherein said future network statistics comprise one or more of: latency, jitter, utilization, and loss.

The non-transitory medium of any preceding or following implementation, wherein the GNN is periodically re-trained in an asynchronous manner based on network traffic characteristics.

The non-transitory medium of any preceding or following implementation, wherein the GNN is implemented in software or hardware selected from a set of hardware comprising: a central processing unit (CPU), a graphical processing unit (GPU), and a field programmable gate array (FPGA).

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general-purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to +5%, less than or equal to +4%, less than or equal to +3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art. One of ordinary skill in the art will appreciates that various modifications and changes can be made without departing from the scope of the disclosure or the claims below. Accordingly, the specification and figures are to be regarded in an illustrative rather than a restrictive sense, and all such modifications are intended to be included within the scope of the disclosure.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Reward Functions For Optimizing

| Operation | Goal | Note |
| --- | --- | --- |
| Packet Loss | Minimize | Bulk data transfers require minimal packet loss |
| Latency | Minimize | Interactive traffic is sensitive to this |
| Jitter | Minimize | Results in more predictable behavior for traffic |
| Network Utilization | Maximize | Higher values mean better performance |

TABLE 2

Hecate Characteristic Features

| Site Data | Site Time | Link Health |
| --- | --- | --- |
| Data Volume Classes: | Data Duration Classes: | Link Attributes: |
| Jumbo | Short | Loss |
| Interactive | Medium | Delay |
| Default | Long | Jitter |
| Slow Update Cycle | Slow Update Cycle | Fast Update Cycle |

TABLE 3

Flow Characteristics Between Sites

| — | ANL | CERN | FNAL | LBNL | ORNL |
|---|---|---|---|---|---|
| ANL | — | 0.88 | 0.23 | 0.01 | 0 |
| CERN | 0 | — | 0.01 | 0.02 | 0.01 |
| FNAL | 0.21 | 0.01 | — | 0 | 0.01 |
| LBNL | 0.03 | 0.01 | 0.01 | — | 0 |
| ORNL | 0.08 | 0.06 | 0.09 | 0 | — |

TABLE 4

| Network Innovation | Current Solution Examples | HECATE's Approach |
|---|---|---|
| Optimizing traffic engineering for utilization, remove congestion and improve flow completion times (multiobjective) | Current products use industry optimization algorithms, shortest possible path and standard approaches | Data-driven learning on traffic characteristics (subdividing them into Hecate traffic classes) and learning additional optimal solutions through data-driven learning |
| Application specific optimization | No solutions exist that optimizes for applications | Hecate's traffic classes learn the various dominant characteristics and they optimizes based on this to meet the SLA requirements |
| Network automation | Current tools use automation tools like orchestrators, but still require engineers to push configuration commands | Hecate is hardware and software agnostic. It is thus able to render to multiple devices to push commands automatically. It can be configured to self-drive without any human interaction |
| Multi-objective optimization | Current tools only optimize for specific parameters | Hecate's model-based and model-free techniques allow it to optimize on multiple factors, learning optimal thresholds itself |
| Network monitoring | Current options provide varying degrees of monitoring options. | Hecate provides monitoring as a result of understanding the active topology at any given point in time. Hecate collects its own data. |
| Network Conductor | Conductor is a new term we are introducing | Conductor is the brain that connects to orchestrators. All APIs to multiple devices can exist in the orchestrator; this allows Hecate to work with multiple network arrangements. |

What is claimed is:

1. An apparatus for autonomous network traffic management, comprising:
   (a) a non-transitory medium storing instructions executable by said one or more processors;
   (b) wherein said instructions, when executed by at least one of the processors, perform steps comprising:
      (i) detecting and extracting real-time network monitoring data as network traffic profiles from a network, and network health data from the network wherein said network health data comprises a historical database of recent network monitoring data that has been analyzed as endpoint behaviors;
      (ii) predicting future network statistics based on the network traffic profiles and the network health data;
      (iii) creating traffic classes from patterns in the network traffic profiles and the network health data for use as input to an artificial intelligence instance;
      (iv) simulating traffic over the network for each of the traffic classes;
      (v) optimizing network path routing and prioritizing traffic based on network optimization objectives directed toward meeting user objectives, by utilizing deep reinforcement learning using the predicted future network statistics; and
      (vi) implementing the optimized network path routing over the network for particular network traffic profiles.

2. The non-transitory medium of claim 1, wherein said acquiring network traffic profiles and said network health data instructions when executed by the processor further performs steps comprising:
   (a) inputting a sampling time frame;
   (b) collecting network information over the sampling time frame;
   (c) outputting the network information into the historical database;
   (d) wherein the historical database comprises:
      (i) a source in the network;
      (ii) a destination in the network;
      (iii) a transfer size;
      (iv) a transfer duration; and
      (v) network health data; and
   (e) predicting an optimal solution for source-destination pathways for certain traffic classes.

3. The non-transitory medium of claim 2, wherein each of the certain traffic classes is selected from a group of traffic classes comprising:
   (a) long-living flows that contain multiple TB to multiple PB data transfers lasting 1-200 hours;
   (b) short-lived flows that contain short amounts of "bursty" data transfers lasting less than 60 seconds;
   (c) low-latency traffic flows that require low latency and minimum packet loss;

(d) priority flows that can be prioritized over other flows in the network;
(e) high throughput flows that require bandwidth greater than 100 GB/s;
(f) intent-based flows that have particular conditions associated with them as deadlines, forbidden paths and required network characteristics; and
(g) default flows with no requirements attached.

4. The non-transitory medium of claim 2, wherein said network health data is selected from one or more of a group of data comprising:
(a) latency;
(b) loss;
(c) bandwidth; and
(d) jitter.

5. The non-transitory medium of claim 3, wherein said optimizing network path routing when executed by the processor further performs steps comprising:
(a) training a simulator Graph Neural Network (GNN) to provide the optimal solution for source-destination pathways; and
(b) simulating each of the certain traffic classes on the GNN to output the optimal solution for source-destination pathways.

6. The non-transitory medium of claim 5, wherein said implementing the optimized network path routing over the network for the particular network traffic profiles when executed by the processor further performs steps comprising:
(a) communicating routing actions directly to network elements; and
(b) utilizing the routing actions to transfer a future data transfer from a designated source to a designated destination according to the optimal solution for source-destination pathways for each of the certain traffic classes of the future data transfer.

7. The non-transitory medium of claim 5, wherein said simulator Graph Neural Network (GNN) is hardware accelerated.

8. The non-transitory medium of claim 7, wherein said hardware acceleration is accomplished by utilization of a Raspberry Pi or a field programmable gate array (FPGA).

9. An apparatus for autonomous network traffic management, comprising:
(a) one or more network traffic monitors are coupled to network elements within a network to monitor their activity and having a traffic coordinator which communicates back to the apparatus for autonomous network management;
(b) one or more processors configured to receive input from one or more of the network traffic monitors; and
(c) a non-transitory memory storing instructions executable by the processor;
(d) wherein said instructions, when executed by the processor, perform steps comprising:
  (i) detecting and extracting network traffic profiles and network health based on at least one of the network traffic monitors;
  (ii) identifying traffic on the network, as network traffic, over a period of time into one or more traffic classes from patterns in the network traffic and generating network health data, over the period of time, for use as input to an artificial intelligence instance;
  (iii) storing network traffic information into an historical database;
  (iv) providing information from the traffic classes, the network health data and the network traffic information to at least one AI/ML (Artificial Intelligence/Machine Learning) library, wherein the AI/ML library comprises a graph neural network (GNN) component;
  (v) predicting future network health from the AI/ML library graph neural network (GNN) component to create a Predicted and Optimal network solution;
  (vi) simulating traffic over the network for each of the traffic classes, including applying predictions for future network health characteristics;
  (vii) Optimizing network path routing and prioritizing the network traffic based on the prediction and the simulation
  (viii) implementing the optimized network routing over the network for particular traffic profiles
  (ix) outputting the Predicted and Optimal network solution to a Route Behavior Engine (RBE).

10. The non-transitory medium of claim 9, wherein said identifying network traffic and network health data instructions when executed by the processor further performs steps comprising:
(a) inputting a sampling time frame;
(b) collecting network information over the sampling time frame;
(c) outputting the network information into the historical database;
(d) wherein the historical database comprises:
  (i) a source in the network;
  (ii) a destination in the network;
  (iii) a transfer size;
  (iv) a transfer duration; and
  (v) network health data; and
(e) predicting an optimal solution for source-destination pathway for a certain traffic classes.

11. The non-transitory medium of claim 10, wherein said traffic classes are selected from a group of traffic classes comprising:
(a) long-living flows that contain multiple TB to multiple PB data transfers lasting 1-200 hours;
(b) short-lived flows that contain short amounts of "bursty" data transfers lasting less than 60 seconds;
(c) low-latency traffic flows that require low latency and minimum packet loss;
(d) priority flows that can be prioritized over other flows in the network;
(e) high throughput flows that require bandwidth greater than 100 GB per second;
(f) intent-based flows that have particular conditions associated with them such as deadlines, forbidden paths and required network characteristics; and
(g) default flows with no requirements attached.

12. The non-transitory medium of claim 10, wherein said network health data is selected from one or more of a group of data comprising:
(a) latency;
(b) loss;
(c) bandwidth; and
(d) jitter.

13. The non-transitory medium of claim 10, wherein said optimizing network path routing when executed by the processor further performs steps comprising:
(a) training the Graph Neural Network (GNN) to provide the optimal solution for source-destination pathway, and
(b) simulating the certain traffic classes on the GNN to output the optimal solution for source-destination pathway.

14. The non-transitory medium of claim 13, wherein said implementing the optimized network path routing over the network for the particular network traffic profiles when executed by the processor further performs steps comprising:
   (a) communicating routing actions directly to the Route Behavior Engine (RBE); and
   (b) utilizing the routing actions to transfer a future data transfer from a designated source to a designated destination according to the optimal solution for source-destination pathway for the certain traffic classes of the future data transfer.

15. The non-transitory medium of claim 13, wherein said simulator Graph Neural Network (GNN) is hardware accelerated.

16. The non-transitory medium of claim 15, wherein said hardware acceleration is accomplished by utilization of a Raspberry Pi or a field programmable gate array (FPGA).

17. An apparatus for autonomous network traffic management, comprising:
   (a) a non-transitory medium storing instructions executable by one or more processors;
   (b) wherein said instructions, when executed by at least one of the processors, perform steps comprising:
      (i) providing one or more network optimization goals for a network;
      (ii) detecting and extracting real-time network monitoring data as network traffic profiles from a network, and network health data from the network wherein said network health data comprises a historical database of recent network monitoring data that has been analyzed as endpoint behaviors;
      (iii) creating traffic classes from patterns in the network traffic profiles and the network health data for use as input to an artificial intelligence instance;
      (iv) predicting future network statistics on a pretrained hardware accelerated Graph Neural Network (GNN) based on the network traffic profiles and the network health data;
      (v) inputting the future network statistics, the one or more network optimization goals, a network topology, and a network characteristic end point behavior into a Graph Optimizer to output optimized path information;
      (vi) simulating traffic over the network for each of the traffic classes; and
      (vii) generating an optimized network path routing, and prioritizing traffic based on network optimization objectives, over the network using a Path Computation Engine (PCE), the optimized path information, and the network topology.

18. The non-transitory medium of claim 17, wherein said future network statistics comprise one or more of: latency, jitter, utilization, and loss.

19. The non-transitory medium of claim 17, wherein the GNN is periodically re-trained in an asynchronous manner based on network traffic characteristics.

20. The non-transitory medium of claim 17, wherein the GNN is implemented in software or hardware selected from a set of hardware consisting of: a central processing unit (CPU), a graphical processing unit (GPU), and a field programmable gate array (FPGA).

* * * * *